(12) United States Patent
Lannestedt et al.

(10) Patent No.: US 11,573,172 B2
(45) Date of Patent: Feb. 7, 2023

(54) BROAD RANGE GAS ILLUMINATION AND IMAGING

(71) Applicant: FLIR Systems AB, Taby (SE)

(72) Inventors: Tomas Lannestedt, Stockholm (SE); Ulf Wallgren, Lidingo (SE); Jonas Sandsten, Lomma (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 16/352,351

(22) Filed: Mar. 13, 2019

(65) Prior Publication Data

US 2019/0212261 A1   Jul. 11, 2019

Related U.S. Application Data

(63) Continuation of application No. PCT/US2017/051219, filed on Sep. 12, 2017.

(60) Provisional application No. 62/395,367, filed on Sep. 15, 2016.

(51) Int. Cl.
*G01N 21/3504* (2014.01)
*G01J 3/427* (2006.01)

(52) U.S. Cl.
CPC .......... *G01N 21/3504* (2013.01); *G01J 3/427* (2013.01); *G01N 2201/0221* (2013.01)

(58) Field of Classification Search
CPC ...... G01N 21/3504; G01J 3/427; G01J 3/108; G01J 3/0286; G01J 3/0237; G01J 3/0208; G01J 3/2823
See application file for complete search history.

(56) References Cited

U.S. PATENT DOCUMENTS

| | | | |
|---|---|---|---|
| 4,491,730 A | 1/1985 | Pedersen | |
| 4,772,789 A * | 9/1988 | Maram | G01M 3/38 250/330 |

(Continued)

FOREIGN PATENT DOCUMENTS

| | | |
|---|---|---|
| CN | 103439292 A | 12/2013 |
| CN | 103884449 A | 6/2014 |

(Continued)

OTHER PUBLICATIONS

Tingzhu, Bai et al., "Principle and Technology of Photoelectric Imaging", pp. 443-444, Jan. 31, 2006.

*Primary Examiner* — Edwin C Gunberg
(74) *Attorney, Agent, or Firm* — Haynes and Boone, LLP

(57) ABSTRACT

Systems and methods disclosed herein provide for detecting gas by: illuminating, with a controllable illuminator system, a scene with light including radiation within the infrared (IR) wavelength range; controlling the illuminator system to emit light at a first wavelength corresponding to a first absorption level of a gas and at a second wavelength corresponding to a second absorption level of a gas, such that an equal amount of radiant energy over a time period is emitted onto the scene for each of said first and second wavelengths; and capturing a first IR image of the scene being illuminated with light at said first wavelength and a second IR image of the scene illuminated with light at said second wavelength, and comparing said first and second IR images to determine whether a characteristic for at least one specific gas is represented in said first and/or second IR images.

20 Claims, 16 Drawing Sheets

(56) References Cited

U.S. PATENT DOCUMENTS

| | | | | |
|---|---|---|---|---|
| 2005/0225840 A1* | 10/2005 | Drasek | ............... | G01N 21/39 359/333 |
| 2009/0141281 A1* | 6/2009 | Stothard | ............ | H01S 3/1083 372/21 |
| 2009/0213882 A1* | 8/2009 | Weida | ............. | G01N 21/3504 372/23 |
| 2011/0096800 A1 | 4/2011 | Weida et al. | | |
| 2015/0369730 A1* | 12/2015 | Schmidt | ............... | G01S 17/89 250/208.1 |
| 2016/0028207 A1* | 1/2016 | Cable | ................. | H01S 5/183 372/20 |
| 2016/0178517 A1 | 6/2016 | Deguchi et al. | | |

FOREIGN PATENT DOCUMENTS

| | | |
|---|---|---|
| CN | 104755908 A | 7/2015 |
| EP | 0489546 | 6/1992 |
| GB | 2311852 | 12/1999 |
| JP | 2003294567 A | 10/2003 |
| WO | WO 2018/052910 | 3/2018 |

* cited by examiner

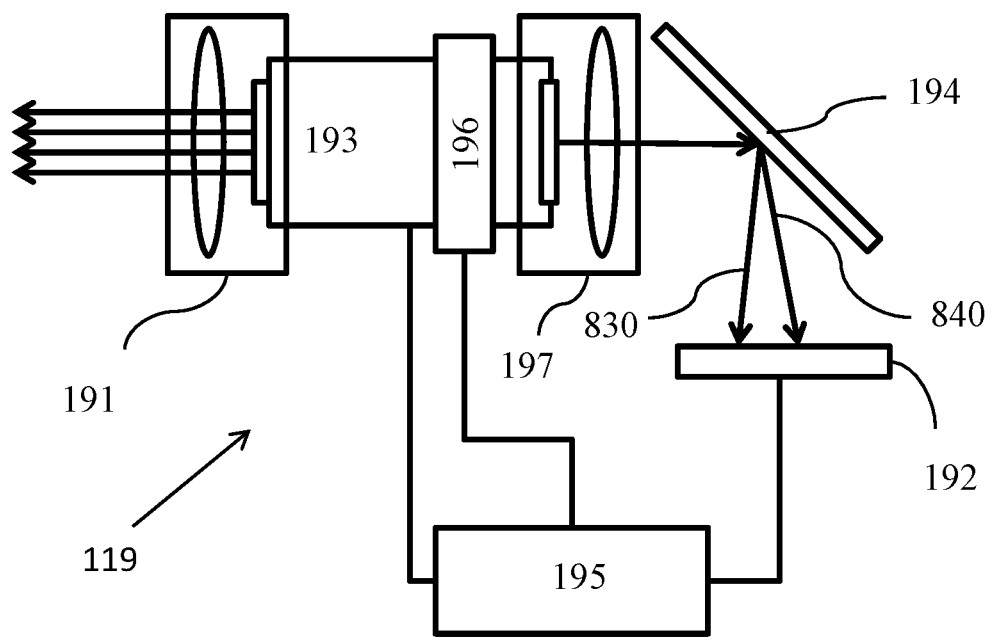
Fig 8A
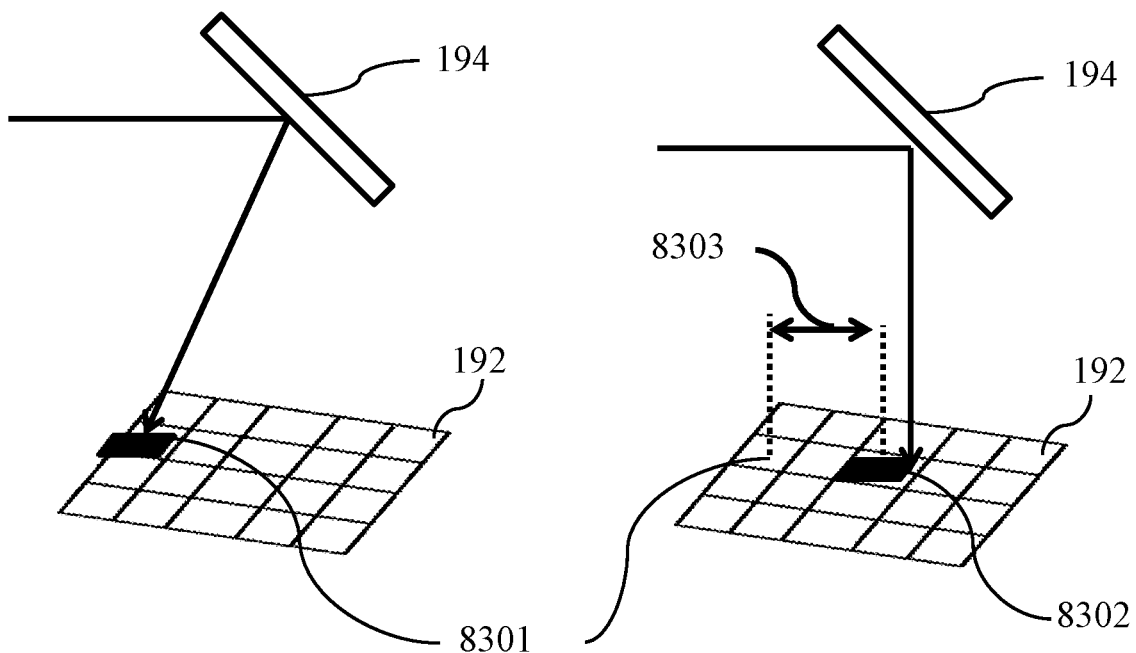
Fig 8B                    Fig 8C

BROAD RANGE GAS ILLUMINATION AND IMAGING

CROSS-REFERENCE TO RELATED APPLICATIONS

This application is a continuation of International Patent Application No. PCT/US2017/051219 filed Sep. 12, 2017 and entitled "BROAD RANGE GAS ILLUMINATION AND IMAGING," which is incorporated herein by reference in its entirety.

International Patent Application No. PCT/US2017/051219 filed Sep. 12, 2017 claims priority to and the benefit of U.S. Provisional Patent Application No. 62/395,367 filed Sep. 15, 2016 and entitled BROAD RANGE GAS ILLUMINATION AND IMAGING," which is hereby incorporated by reference in its entirety.

TECHNICAL FIELD

The present disclosure relates generally to thermal imaging techniques to detect and visualize gases or fugitive gases using an IR detector and an illuminator system.

BACKGROUND

Thermal, or infrared (IR), images of scenes are often useful for monitoring, inspection and/or maintenance purposes, e.g. for monitoring gas leaks at an industrial plant. Typically, a thermal imaging device, e.g. in the form of a thermography arrangement or an infrared IR camera, is provided with an IR detector to capture infrared (IR) image data values, representing infrared radiation emitted from an observed real world scene. The captured IR image can after capturing be displayed and analyzed on a display, either in the thermal imaging device or in a computing device such as a tablet computer, a smartphone, a laptop or a desktop computer. Thermal imaging devices might be used for detecting gas and producing a visual representation of a gas image of an observed real world scene, e.g. thereby visualizing gas leaks as smoke like images on the camera's viewfinder, on an inbuilt LCD, or on an external computing device, thereby allowing the user to see or visualize fugitive gas emissions. For many gases, the ability to absorb infrared radiation depends on the wavelengths of the radiation. In other words, their degree of transparency to IR radiation varies with the wavelength of the infrared radiation. There may be IR wavelengths that make some gases appear essentially opaque due to absorption by those gases while other IR wavelengths make those gases appear essentially transparent due to little or no absorption of light by those gases. Physical property databanks exist that contain infrared absorption data, also referred to as absorption spectra, for many substances. To determine the infrared absorption spectra for a gas, a sample is placed in an IR spectrometer and the absorption (or transmission) of infrared radiation is measured at different wavelengths. The resulting absorption data are normally represented as graphs, also referred to as spectra or gas spectra. When IR radiation is emitted from an observed real world scene and captured as an IR image by a thermal imaging device, gas can be detected as areas in the IR image containing gas in relation to areas in the IR image not containing gas. The reason for this is that the IR radiation from the observed real world scene will be attenuated differently depending on if gas is present or not. This difference in attenuation depends on the amount of gas molecules or the concentration of gas molecules in the path between the observed real world scene and the thermal imaging devices. The minimum concentration of gas or the minimum amount of gas that can be detected depends largely on the sensitivity of the thermal imaging device.

Some conventional thermal imaging devices use a filter that restricts the camera to operating in a narrow spectral range representing an absorption wavelength where the gas to be detected has high absorption, thereby selectively enhancing the detection and visualization of gas, e.g. a gas leak. Some conventional thermal imaging devices further use an IR sensor cooling arrangement allowing the filter, optical path and IR sensor to operate at cryogenic temperatures, thereby improving the sensitivity of the thermal imaging device.

However, a problem with conventional systems is that the sensitivity of the thermal imaging device might be too low to detect gas of a certain concentration. Yet another problem with conventional systems is that they are complex, are relatively large in size, are relatively heavy, have high manufacturing costs and increase overall power consumption, which in the case of a portable unit results in reduced usage time, e.g. when operating on batteries. Yet another problem with conventional systems is that the filter is adapted to a particular wavelength and cannot be used for a broad range of gases with varying gas absorption or transmission of infrared radiation.

Therefore, there is a need to address the problems of conventional systems to improve gas concentration sensitivity in gas imaging with reduced complexity, size, weight, manufacturing cost and/or overall power consumption for imaging for example a wide range of gases without hardware reconfigurations that result in high cost and weight increase.

SUMMARY

The present disclosure relates to methods, thermal imaging devices and non-transitory computer readable media for illuminating, imaging, quantifying and/or visualizing gas. In particular providing an improved gas concentration sensitivity in gas imaging with reduced complexity, size, weight, manufacturing cost and/or overall power consumption for imaging for example a wide range of gases without hardware reconfigurations that result in high cost and weight increase.

Furthermore, embodiments of the present disclosure enable detection of gas, and further, according to some embodiments, quantification of detected gas, using such a low complexity, size, weight, manufacturing cost and/or overall power consumption IR imaging system.

Aspects of the invention enable detection and quantification of gas using a thermal imaging device with one or more uncooled detectors, providing an inexpensive, low complexity, but high quality, gas detection and quantification.

According to embodiments, a method of detecting gas is provided, the method comprising: illuminating, with a controllable illuminator system, a scene with light including radiation within the infrared (IR) wavelength range; controlling the illuminator system to emit light at a first wavelength $\lambda_1$ corresponding to a first absorption level of a gas and at a second wavelength $\lambda_2$ corresponding to a second absorption level of a gas, such that an equal amount of radiant energy over a time period $\tau$ is emitted onto the scene for each of said first and second wavelengths; and capturing, with an IR detector of a thermal imaging device, a first IR image of the scene being illuminated with light at said first wavelength $\lambda_1$ and a second IR image of the scene illuminated with light at said second wavelength $\lambda_2$, and comparing said first and second IR images to determine whether a characteristic for at least one specific gas is represented in said first and/or second IR images.

According to embodiments, the IR detector, for detected radiation within said first and second wavelength reflected from a background in the scene, is adapted to generate: a high output signal level in the absence of gas in the scene; and a low output signal level in the presence of gas in the scene, due to absorption of radiation within said first and/or second wavelength.

According to embodiments, the method further comprises: controlling the illuminator system to turn off illumination of the scene; capturing a third IR image of the non-illuminated scene; and comparing said first, second and third IR images to determine whether a characteristic for a specific gas is represented in said first and/or second IR images.

According to embodiments, the illuminator system is controlled with pulse width modulation such that a substantially equal amount of energy is emitted during a time period r for each of said first and second wavelengths, and wherein the time period ti is selected to correspond to the time constant of the IR detector of the thermal imaging device.

According to embodiments, the method further comprises quantifying gas present in the scene as indicated by an output signal of the IR detector.

According to embodiments, the method further comprises quantifying gas based on said first and said second IR images.

According to embodiments, the method further comprises quantifying gas present in the scene by: determining a gas concentration length (GCL) for the gas present in the scene; determining a length associated with the gas present in the scene; and calculating a concentration of the gas using the GCL and the length associated with the gas.

According to embodiments, a system for detecting gas is provided, the system comprising: a controllable illuminator system configured to illuminate a scene with light including radiation within the infrared (IR) wavelength range; a control unit configured to control the illuminator system to emit light at a first wavelength $\lambda_1$ corresponding to a first absorption level of a gas and at a second wavelength $\lambda_2$ corresponding to a second absorption level of a gas, such that an equal amount of radiant energy over a time period $\tau$ is emitted onto the scene for each of said first and second wavelengths; and a thermal imaging device configured to capture a first IR image of the scene being illuminated with light at said first wavelength $\lambda_1$ and a second IR image of the scene illuminated with light at said second wavelength $\lambda_2$ by means of an IR detector, wherein the system is configured to compare said first and second IR images to determine whether a characteristic for at least one specific gas is represented in said first and/or second IR images.

According to embodiments, an IR detector of the thermal imaging device, for detected radiation within said first and second wavelength reflected from a background in the scene, is configured to generate a high output signal level in the absence of gas in the scene; and a low output signal level in the presence of gas in the scene, due to absorption of radiation within said first and/or second wavelength.

According to embodiments, the system is further configured to: control the illuminator system to turn off illumination of the scene; capture a third IR image of the non-illuminated scene; and compare said first, second and third IR images to determine whether a characteristic for a specific gas is represented in said first and/or second IR images.

According to embodiments, the illuminator system is controlled with pulse width modulation such that a substantially equal amount of energy is emitted during a time period $\tau$ for each of said first and second wavelengths, and wherein the time period $\tau$ is selected to correspond to the time constant of an IR detector of the thermal imaging device.

According to embodiments, the system is further configured to quantify gas present in the scene as indicated by an output signal of the IR detector.

According to embodiments, the system is further configured to quantify gas based on said first and said second IR images.

According to embodiments, the system is further configured to quantify gas present in the scene by: determining a gas concentration length (GCL) for the gas present in the scene; determining a length associated with the gas present in the scene; and calculating a concentration of the gas using the GCL and the length associated with the gas.

According to embodiments, the first wavelength $\lambda_1$ is absorbable by a first gas, and the second wavelength $\lambda_2$ is absorbable by a second gas.

According to embodiments, the first wavelength $\lambda_1$ has a low absorption value for a selected gas, and the second wavelength $\lambda_2$ has a high absorption value for the selected gas.

According to embodiments, the system is configured to compare said first and second IR images at least by generating a difference image based on said first and said second IR images.

According to embodiments, system is configured to compare said first and second IR images at least by generating a difference image based on said first, said second and said third IR images.

According to embodiments, a thermal imaging device for detecting gas is provided, the device comprising a controllable illuminator system; and an infrared (IR) imaging system, a memory and a processor, being adapted to perform the steps and functions of any one of the described methods.

According to embodiments, a computer-readable medium for detecting gas by means of a controllable illuminator system and a thermal imaging device, comprising stored thereon: non-transitory information for performing any one of the described methods; and/or non-transitory information configured to control a processor/processing unit to perform any of the steps or functions of any one of the described methods.

According to embodiments, a computer program product for detecting gas by means of a controllable illuminator system and a thermal imaging device, comprising code portions adapted to control a processor to perform any of the steps or functions of any one of the described methods.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The present invention will be further explained by means of exemplifying embodiments and with reference to the accompanying claims, in which:

FIG. 8A shows a schematic view of an illuminator system that illustrates an example of how a drift or offset of the emitted light wavelength is detected and compensated by an illuminator system of a thermal imaging device, in accordance with one or more embodiments of the disclosure.

FIG. 8B shows a sketch that illustrates an example of how a drift or offset of the emitted light wavelength is detected during calibration of an illuminator system of a thermal imaging device, in accordance with one or more embodiments of the disclosure.

FIG. 8C shows a sketch that illustrates an example of how a drift or offset of the emitted light wavelength is detected during operation of an illuminator system of a thermal imaging device, in accordance with one or more embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Introduction

Figure 1:
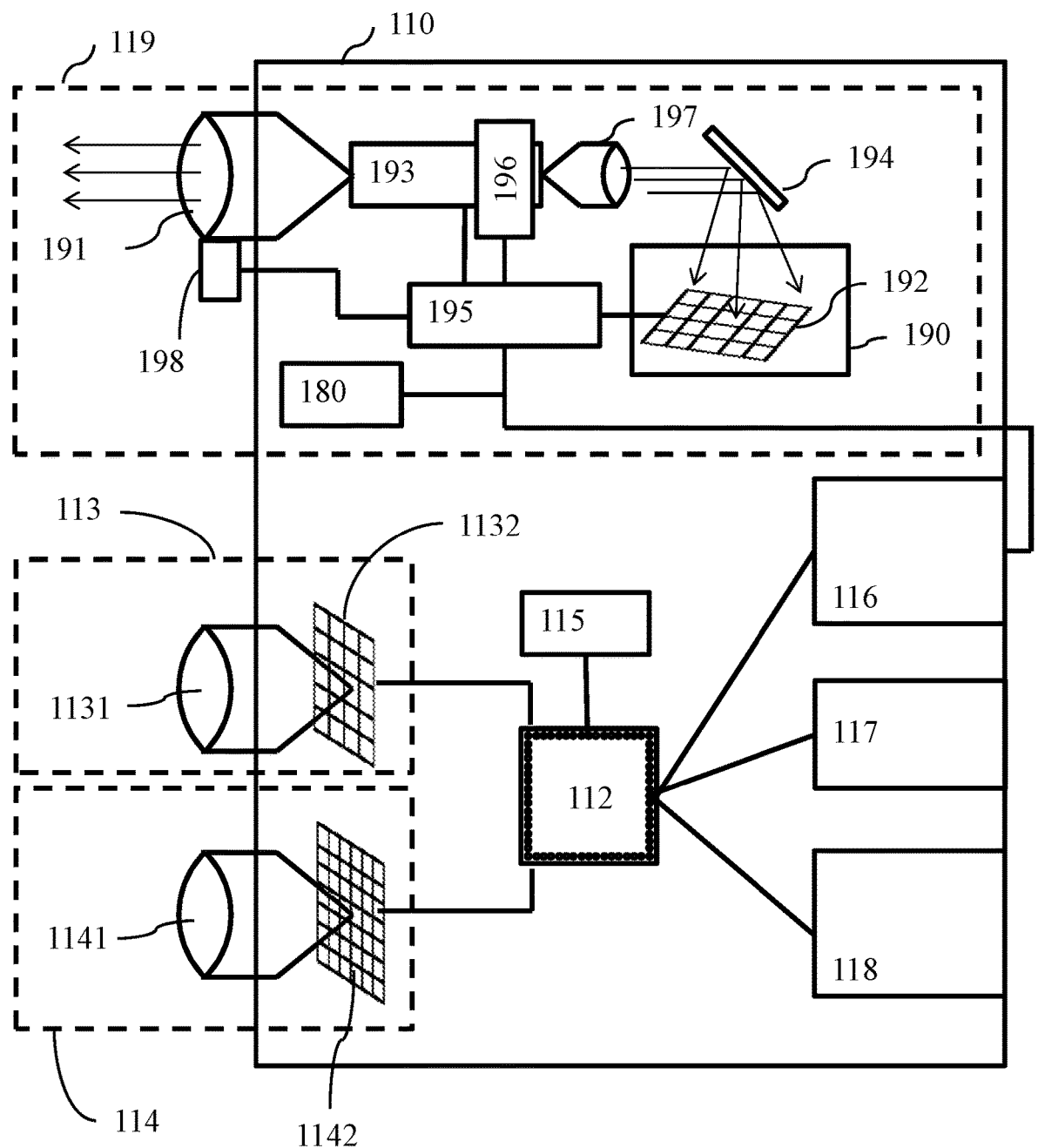
FIG. 1 shows a schematic view of a thermal imaging device comprising an infrared (IR) imaging system and an illuminator system where the illuminator system comprises a laser light emitter, a laser light emitter cooling unit, and a feedback system, in accordance with one or more embodiments of the disclosure.

Thermal imaging devices, such as infrared (IR) cameras comprising an infrared (IR) imaging system, are often used in various applications such as surveillance and inspection or monitoring of various objects, for example industrial installations and buildings. Such thermal imaging devices are generally configured to capture an infrared (IR) image comprising a frame of IR image data values that represent infrared radiation emitted from an observed real world scene. IR cameras with an IR imaging system generally employ a lens operating to direct received radiation onto an infrared (IR) detector adapted to provide an image of a view of an observed real world scene.

The operation of such IR cameras is generally such that infrared energy is received via infrared optics, including a lens, and directed onto IR detector elements. Each detector element responds to the infrared radiation or heat energy received. A frame of IR image data values may be captured by scanning the rows and/or columns of a detector for an analog value or in some embodiments scanning for an analog to digital converted value to obtain a captured IR image. In such an IR image, IR image data values associated with each detector element is referred to as IR image pixels in the IR image, having an associated row and column index.

Thermal imaging devices may also be used for detecting or imaging gas occurring in an observed real world scene. This may be performed by generating a gas image, herein also called a gas representing image, in the form of or based on one or more captured IR images. However, the sensitivity of a conventional thermal imaging device may not be sufficient to observe low concentrations of gas. The conventional solution to this problem is to add a filter corresponding to absorption wavelengths or to transmission wavelengths of infrared radiation for a particular gas or substance. To further improve the sensitivity, conventional systems may be configured to cool the detector, the filter and the infrared radiation path inside the thermal imaging device.

Improved sensitivity to gas concentration, which would permit improved gas representing images to be generated, may be achieved by illuminating an observed real world scene by means of an illuminator system. The illuminator system is then adapted to emit and illuminate the scene with light or radiation within an absorption wavelength for a gas or a plurality of gases of interest and within a wavelength range that is detectable by the thermal imaging device. In embodiments, the illuminator system may be adapted to emit and illuminate the scene more particularly with light or radiation within the detectable wavelength range of an IR detector comprised in the thermal imaging device. The absorption wavelength is obtained or derived based on a relation indicative of absorption or transmission values of infrared radiation by a gas or gases of interest for various wavelengths of IR radiation or light. The light emitted by the illuminator system is reflected back from the observed scene, thus increasing the radiation emitted from objects in the observed real world scene. As infrared radiation is attenuated differently by gas present between the observed real world scene and the thermal imaging device, sections in an IR image captured by the thermal imaging device depicting areas with gas present may be detected in one or more IR images, and a gas representing image may be generated.

A gas image is in embodiments described herein to be understood to include a frame of gas image data values, also referred to as gas image pixels, representative of an amount of gas molecules or a concentration of gas molecules present in a real world scene, between a background of the observed real world scene and a thermal imaging device observing the real world scene, wherein the gas image data values have an associated row and column index.

Embodiments of the invention may be used to quantify detected gas, for example with the purpose of determining the quantity of gas in a gas leak. The quantified information may be used to determine the urgency of a potential problem with the gas leak and what, if any, measures need to be taken. This determination of urgency or action to be taken is, in accordance with some embodiments, automatic. For example, the quantified information may be compared to one or more preset alarm levels, values in a look-up-table or the like. Alternatively or additionally, a user of a thermal imaging device, or a person later reviewing the captured data, may be enabled to make the determination by the system presenting a visual representation or other suitable feedback of the quantification information to the user on a display integrated in, connected to, or communicatively coupled to the thermal imaging device, or on a display of an external device used for later viewing and interpretation of data captured by the thermal imaging device.

Illuminator System and Thermal Imaging Device

FIG. 1 shows a schematic view of one or more embodiments of a thermal imaging device 110, e.g. in the form of an infrared IR camera, comprising an infrared (IR) imaging system 113 that is configured to capture infrared (IR) images in the form of IR image data values representing infrared radiation emitted from an observed real world scene. The thermal imaging device 110 further comprises an illuminator system 119 configured to emit electromagnetic radiation in the form of light onto the observed real world scene, in particular having a wavelength representing an absorption wavelength for a gas. In embodiments, the illuminator system 119 may be integrated with the thermal imaging device 110, or the illuminator system 119 may be configured as a separate unit communicatively couplable to the thermal imaging device 110.

One or more embodiments of an illuminator system 119 comprises a light emitter 193 configured to emit light in response to receiving a control signal via a primary output 191 and via a secondary output 197, said primary and secondary outputs being comprised in the light emitter 193 or in the illuminator 119. For example, the light emitter 193 of the illuminator system 119 may be a laser light emitter. The primary output of the light emitter 193 is configured to direct at least some or a part of, or the majority of, the light emitted from the light emitter 193 onto an observed real world scene. For example, about 99% or more of the light or output power generated in or for the light emitter 193 may be emitted via the primary output 191.

An optical beam distributor, for example in the form of a beam bender 194, is configured to receive a light beam and to diffract or refract the light beam at an angle dependent on a wavelength of the light beam. The secondary output 197 is configured to direct at least some or a reduced part of the light emitted from the light emitter 193 as a light beam onto the beam bender 194. For example, about 1% or less of the light or output power generated in or for the light emitter 193 may be emitted via the secondary output 197. The light emitted from the secondary output is in embodiments used in a feedback system of the illuminator system to determine the wavelength of the laser light emitted by the emitter 193. An infrared (IR) radiation value read-out circuit 190 is coupled to or comprises an IR detector array 192 configured to receive the diffracted or refracted light beam from the beam bender 194. The IR read-out circuit 190 is configured to capture a set of IR radiation values including one or more values from one or more array elements of the IR detector array 192 representing the diffracted or refracted light beam received at the IR detector array 192. A control unit 195 is communicatively coupled to the light emitter 193 and the IR read-out circuit 190. The control unit 195 is configured to generate and adjust the control signal based on the IR radiation values captured by the read-out circuit 190 to control a wavelength of the light emitted by the light emitter 193. In embodiments, the control unit 195 may further be configured to control or switch the light emitter on or off.

In embodiments, the control unit 195 is configured to adjust the control signal based on a spatial displacement of the one or more array element values representing the diffracted or refracted light beam in the set of captured IR radiation values to correct for wavelength drift of the light emitted by the light emitter 193. In such embodiments, the spatial displacement is determined based on a comparison of a reference array element value position with an array element value position of the one or more array element values representing the diffracted or refracted light beam in the set of captured IR radiation values. The reference array element value position may be determined during calibration of the illuminator system 119 and corresponds to an array element value position for a diffracted or refracted light beam having a target wavelength. The illuminator system 119 may further comprise a memory device 180 communicatively coupled to the control unit 195 and configured to store the reference array element value position.

In embodiments, the wavelength of the light emitted by the light emitter 193 varies in response to an amplitude of the control signal. The control unit 195 may be configured to adjust the control signal to control the wavelength by determining the amplitude of the control signal. The control unit 195 may be further configured to control an output power of the light emitted by the light emitter 193 by adjusting the control signal based on a signal intensity of the set of captured IR radiation values. The beam bender 194 may be a diffraction grating configured to split and diffract the light beam into a plurality of diffracted light beams each at an angle dependent on the wavelength of the light beam. In such embodiments, the IR detector array 192 may be configured to receive at least one of the plurality of diffracted light beams. In other embodiments, the beam bender 194 may be a prism configured to refract the light beam at the angle dependent on the wavelength of the light beam.

Embodiments of the illuminator system 119 further comprises a cooling unit 196 communicatively coupled to the control unit 195 and configured to provide cooling to the light emitter 193 in response to a cooling unit control signal. For example, the cooling unit 196 comprises a device attached to or thermally coupled to the light emitter 193 and is configured to maintain a particular operating temperature of the light emitter 193 based on a received control signal, for example in the form of a control current. In such embodiments, the wavelength of the light emitted by the light emitter 193 changes in response to the cooling provided to the light emitter 193. The control signal adjusted by the control unit 195 may be included in the cooling unit control signal. Embodiments that comprise such a cooling unit may address the problem that during operation of the illuminator system, the operating conditions, such as ambient temperature and internal heat generation in the equipment, may change and thereby cause a drift or offset of the emitted laser wavelength. The control signal of the control unit 195 may be adapted to operate to control the drift or the offset in a feedback control loop based on light emitted via the secondary output of the light emitter. This is further explained in conjunction with FIG. 8. Embodiments that comprise such a cooling unit may also address a problem occurring for example when the light emitter 193 4-96 is a laser light emitter, viz. the problem that at a particular operating temperature, the laser light emitter of the illuminator system 119 may only be controlled within a predetermined light wavelength span. By controlling the cooling unit 196 and thereby controlling the operating temperature of the light emitter 193, and simultaneously controlling the laser light emitter, the light wavelength span can be selectively controlled.

In further examples, the light emitter 193 may be a light source in the form of a laser, a lamp or a light-emitting diode (LED) capable of emitting electromagnetic radiation or light, for example a wavelength representing an absorption wavelength for a gas and preferably being in the infrared portion of the electromagnetic spectrum. For example, such light may be emitted by a laser such as a Quantum cascade laser QCL. In embodiments of the illuminator system 119, the control signal is a control voltage or a control current. For example, a light emitter in the form of a quantum-cascade laser QCL may be phase modulated, stabilized and tuned by modifying a laser driving voltage or a laser driving current.

In embodiments of the illuminator system 119, the infrared (IR) radiation value read-out circuit 190 and/or the IR detector array 192 are comprised in an infrared (IR) imaging system of the illuminator system 119. Such an IR imaging system is configured to capture a set of IR radiation values in an IR image including array element values in the form of one or more pixels representing the diffracted or refracted light beam received at the IR detector array. In such embodiments, the control unit 195 is configured to generate and adjust the control signal based on the captured IR image to control a wavelength of the light emitted by the light emitter 193. Infrared (IR) images are generated by means of this IR imaging system with one or more pixels representing the captured diffracted or refracted light beam received at the IR detector array. As mentioned, in such embodiments the control unit 195 is configured to generate and adjust the control signal based on the captured IR image to control a wavelength of the light emitted by the light emitter 193. The position of the detected light beam as represented on the IR image is used by the control unit 195 to adjust the control signal such that it controls the light emitter 193 to emit light having a controlled wavelength as described herein. For example, a feedback to the control unit 195 is provided based on identifying the spatial location of one or more refracted or diffracted laser beams on said IR sensor as spatial pixel displacement in a captured IR image.

The primary output 191 may comprise a selection of an illuminator optical system, optionally provided with a selection of a lens, zoom adjustment functionality, beam expander functionality and/or focus functionality, suitable for directing illuminating light onto an observed real world scene. In one or more embodiments, the primary output 191 of the illuminator system 119 may optionally further comprise a beam expander servo motor 198 that is communicatively coupled to the control unit 195 and configured to adjust the distribution of the light emitted onto an observed real world scene in response to a beam width control signal received from the illuminator system control unit 195.

The IR imaging system 113 comprises an infrared IR detector 1132, for example a micro-bolometer focal plane array. In embodiments, the IR detector 1132 is an un-cooled IR detector. The IR imaging system is provided with an infrared (IR) optical system 1131, for example comprising a lens, zoom functionality and/or focus functionality configured to direct light onto the infrared IR detector 1132. The IR detector 1132 is configured to provide an IR image in the form of a signal frame of IR image data values representing infrared radiation emitted from the observed real world scene. The IR imaging system 113 is arranged to communicate the signal frame of IR image data values to a processor 112, which is communicatively coupled to the IR imaging system 113 and the illuminator system 119. The processor 112 may be arranged to perform any of the steps or functions described herein.

The processor 112 may for example be communicatively coupled to the control unit 195 of the illuminator system 119 via a communications interface 116. Such a communications interface 116 is configured to send and/or receive signals, data values or parameters to and/or from the processor 112 to and/or from external or internal units. An example of an external unit is a separately configured illuminator system 119 or a computing device such as a personal computer (PC) or the like. In order to control the illuminator system 119 by the thermal imaging device 110, the processor 112 and/or the illuminator systems are configured to communicate signals, data and/or parameters adapted for operating the illuminator system 119. A memory 115 is communicatively coupled to the processor 112 and configured to store data values and/or parameters being receivable and/or retrievable from the processor.

In embodiments, the processor 112 is configured to operate the illuminator system 119 to emit light having a first wavelength $\lambda 1$ and light having a second wavelength 22 onto the observed real world scene at respective different times. Further, the processor 112 is configured to operate the IR imaging system 110 to capture a first IR image and a second IR image of the observed real world scene while the light having the first wavelength $\lambda 1$ is emitted and while the light having the second wavelength $\lambda 2$ is emitted, respectively, onto the observed real world scene. In other embodiments, a processor in an illuminator may be configured to control a thermal imaging device, or a separate processor may be configured to control an illuminator and a thermal imaging device. This is used in accordance with one or more embodiments disclosed herein to generate a gas representing image based for example on one or more difference images generated from a first IR image of the scene illuminated with light having the first wavelength $\lambda 1$ and a second IR image illuminated with light having a second wavelength $\lambda 2$. The processor 112 is in such embodiments further configured to detect gas present in the observed real world scene based on the first and the second captured IR images.

The thermal imaging device 110 may further comprise a display 118 configured to receive a signal from the processor 112 and to display the received signal as a displayed image for example being accessible for a user of the thermal imaging device 110. The thermal imaging device 110 may comprise an input device 117 configured to receive input or indications from a user, for example a command from a user to indicate a local area of interest in an IR image. The display 118 may be integrated with a user input device 117 configured to receive a signal from a processor 112 and to display the received signal as a displayed image and receive input or indications from a user, for example by applying touch screen functionality to communicate a user input signal to said processor 112.

One or more embodiments of the thermal imaging device 110 may further comprise a visible light (VL) imaging system 114 that is configured to capture visible light (VL) image data values, representing visible light emitted from the observed real world scene. The VL image data values may be captured substantially simultaneously with said IR image. The VL imaging system is provided with a visible light (VL) detector 1142 and an optical system 1141 configured to direct visible light onto the VL detector 1142. The optical system 1141 may for example comprise a lens, zoom functionality and focus functionality. The VL detector 1142 may for example comprise a digital charge-coupled device (CCD) or complementary metal-oxide-semiconductor (CMOS) active pixel sensors configured to provide a VL image in the form of a signal frame of VL image data values representing visible light emitted from the observed real world scene. The VL imaging system 114 is further arranged to communicate the signal frame of VL image data values to the processor 112.

In one or more embodiments, the VL imaging system 114 may be adapted to capture electromagnetic radiation in other non-thermal wavelengths in addition to or in place of visible light wavelengths. For example, the VL imaging system 114 may be configured to capture near-infrared (NIR) light, short wave infrared (SWIR) light, ultra-violet (UV) light, or other non-thermal light in addition to or in place of visible light. For such embodiments, the VL imaging system 114 may represent a non-thermal imaging system comprising a non-thermal optical system (represented by the VL optical system 1141) and a non-thermal detector (represented by the VL detector 1142) responsive to non-thermal radiation. For example, electron multiplying CCD (EMCCD) sensors, scientific CMOS (sCMOS) sensors, intensified charge-coupled device (ICCD) sensors, as well as CCD-based and CMOS-based sensors discussed above and/or other suitable sensors, may be used to implement the non-thermal detector (represented by the VL detector 1142) to detect NIR light, SWIR light, and/or other non-thermal light.

In embodiments, the thermal imaging device 110 and/or the illuminator system 119 is configured such that the control signal from the control unit 195 of the illuminator system 119 comprises signal pulses having an amplitude and a width. In such an embodiment, the wavelength of the light emitted from the light emitter 193 of the illuminator system 119 varies in response to the amplitude of the control signal pulses. An output power of the light emitted from the light emitter 193 of the illuminator system 119 varies in response to the amplitude and the width of the control signal pulses. The control unit 195 of the illuminator system 119 is configured to determine the amplitude and the width of the signal pulses for the light emitter to emit the light having the first wavelength $\lambda_1$ and the light having the second wavelength $\lambda_2$, the width of the control current pulses being decreased to maintain a substantially same output power of the emitted light as the amplitude is increased to vary the wavelength of the emitted light. This addresses the problem that for example may occur in embodiments having a laser light emitter, and when controlling the illuminator system 119 by increasing or decreasing a control signal in the form of a control current passing through the laser light emitter to emit laser light having a first wavelength $\lambda_1$ and then to emit laser light having a second wavelength $\lambda_2$. Controlling the laser light illuminator of the illuminator system to different wavelengths by increasing or decreasing the control current will also change the laser light intensity. This may be significant for example when generating a difference image or a gas representing image based on two images captured during illumination with different wavelengths, where the two images may have different intensity even if no gas is present due to varying output power of the light emitter 193. In embodiments addressing this problem, the laser control current may be pulse-modulated with a certain amplitude as well as a pulse width, effectively switching the laser light emitter on and off multiple times within the time span of an integration time constant $\tau$ of the thermal imaging device. In one example, the integration time constant $\tau$ for a bolometer detector in the thermal imaging device 110 is in the range of 8-15 milliseconds. Such embodiments allow the output power to be controlled and maintained such that the intensity of the radiation and the intensity of detected IR image data values can be kept more or less constant. Thereby the sensitivity of generating a gas representing image with such a thermal imaging device 110 and illuminating system 119 is improved.

The captured IR image, the captured VL image or a combined IR/VL image can after capturing be displayed on a display, either in the thermal imaging device or in a computing device such as a tablet computer, a laptop or a desktop computer in order to enable a user to analyze the result.

In one or more embodiments, the IR imaging system 113 comprised in the thermal imaging device 110 is configured to capture multiple consecutive IR images as a stream of IR images, such as a video with a given frame rate. Similarly, in one or more embodiments, the VL imaging system 114 comprised in said thermal imaging device 110 is configured to capture multiple consecutive VL images as a stream of VL images, such as a video with a given frame rate.

In one or more embodiments the thermal imaging device 110 further comprises a display 118 configured to receive a signal from a processor 112 and to display the received signal as a displayed image, e.g. to a user of the thermal imaging device 110. In one or more embodiments the thermal imaging device 110 further comprises an input device 117 configured to receive input or indications from a user, e.g. a user to indicate a local area of interest in an IR image. In one exemplary embodiment the display 118 is integrated with a user input device 117 configured to receive a signal from a processor 112 and to display the received signal as a displayed image and receive input or indications from a user, e.g. by applying touch screen functionality and to send a user input signal to said processor/processing unit 112.

In one or more embodiments embodiment the thermal imaging device 110 further is adapted to be a handheld type thermal imaging device 110 or a fixed mounted monitoring type thermal imaging device 110. In one or more embodiments, the thermal imaging device 110 is configured as one device in which the IR imaging system and the VL imaging system 114 are integrated. In one or more embodiments the thermal imaging device 110 is configured as two physically separate devices, i.e. a first device comprising a IR imaging system 113 and second device comprising illuminator system 119 communicatively coupled and emitting light onto and capturing substantially the same observed real world scene in practical circumstances. A memory 115 may be integrated into either one or the first or second device or a memory 115 may be integrated in a physically separate memory device, not shown in the figure, to which said first and second device is communicatively coupled.

In one or more embodiments the thermal imaging device 110 is configured to capture infrared (IR) image data values, representing infrared radiation emitted from an observed real world scene and then further to correct or calibrate captured data values by applying pre-determined IR temperature calibration data parameters, to map and scale the captured data values for display as an IR, or thermal, image, singly or combined with a VL image, according to methods known in the art.

Figure 2A:
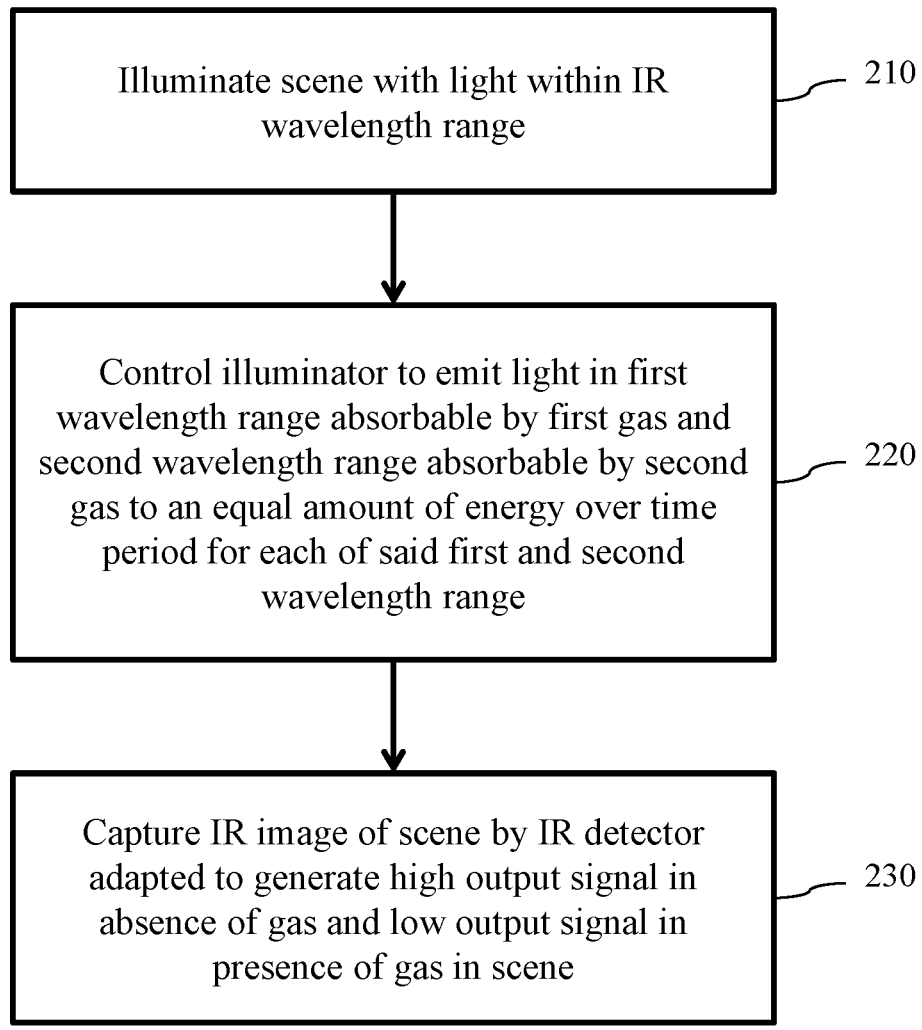
FIG. 2A shows a flow chart of a method of detecting gas, in accordance with one or more embodiments of the disclosure.

FIG. 2A shows a flow chart that illustrates one or more embodiments of a method of detecting gas using one or more embodiments of apparatus illustrated in FIG. 1 and described herein, the method comprising:

At block 210, illuminating, with a controllable illuminator system, a scene with light including radiation within the infrared (IR) wavelength range.

At block 220, controlling the illuminator system to emit light at a first wavelength $\lambda_1$ corresponding to a first absorption level of a gas and at a second wavelength $\lambda_2$ corresponding to a second absorption level of a gas, such that an equal amount of radiant energy over a time period $\tau$ is emitted onto the scene for each of said first and second wavelengths. In embodiments, this is for example achieved by controlling the light emitter with pulse width modulation such that a substantially equal amount of energy is emitted during a time period $\tau$ for each of said first and second wavelengths. In embodiments, the first wavelength $\lambda_1$ is absorbable by a first gas at a first absorption level that is characteristic for the selected first gas, and the second wavelength $\lambda_2$ is absorbable by a second gas at a second absorption level characteristic for the selected second gas. In embodiments, the first wavelength $\lambda_1$ has a low absorption value for a selected gas; and the second wavelength $\lambda_2$ has a high absorption value for the selected gas.

At block 230, capturing, with an IR detector of a thermal imaging device, an IR image of the scene, the IR detector being adapted to generate a high output signal level in the absence of gas and a low output signal level in the presence of gas in the scene. In embodiments, the IR detector, for detected radiation within said first and second wavelength reflected from a background in the scene, is adapted to generate a high output signal level in the absence of gas in the scene, and a low output signal level in the presence of gas in the scene due to absorption of radiation within said first and/or second wavelength.

In embodiments, the method comprises capturing a first IR image of the scene being illuminated with light at said first wavelength $\lambda_1$, capturing a second IR image of the scene illuminated with light at said second wavelength $\lambda_2$, and comparing said first and second IR images to determine whether a characteristic for a specific gas is represented in said first and second IR images. In embodiments, as further explained below, comparing comprises generating one or more difference images to determine the presence of gas and/or to generate images with a representation of gas being present in a depicted scene.

Figure 2B:
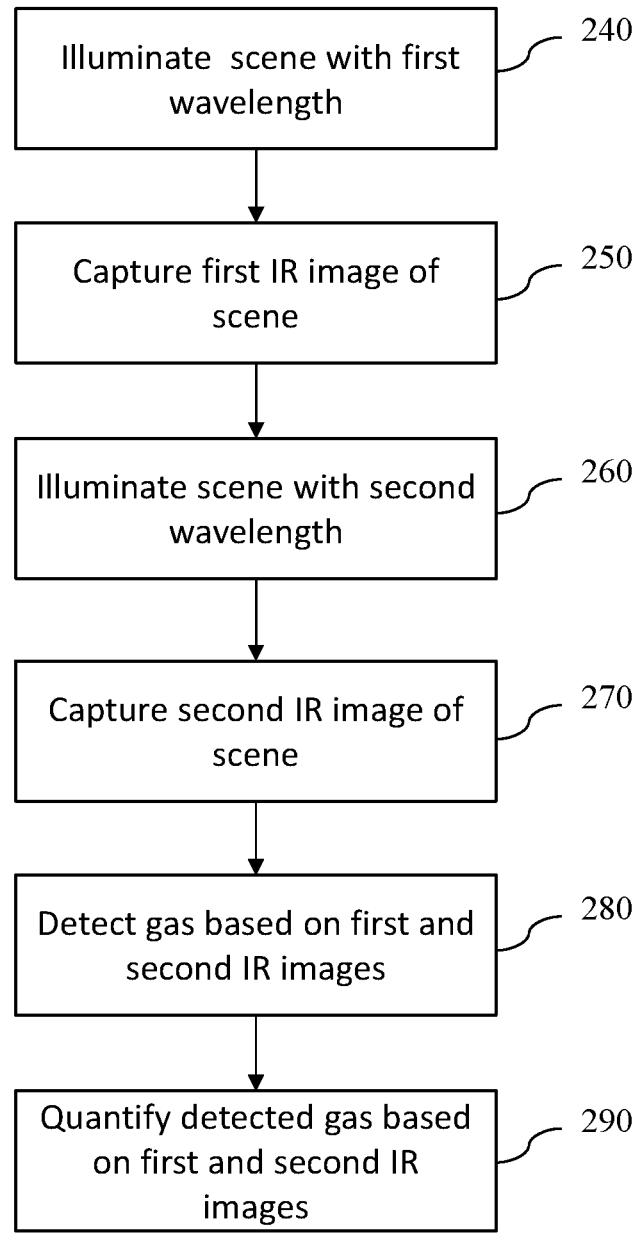
FIG. 2B shows a flow chart of a method for detection and/or quantification of gas present in an observed real world scene, in accordance with one or more embodiments of the disclosure.

FIG. 2B shows a flow chart that illustrates one or more embodiments of a method of detecting gas using one or more embodiments of apparatus illustrated in FIG. 1 and described herein, the method comprising:

At block 240, illuminating a first part of an observed a scene, by controlling a light emitter to emit light of a first wavelength $\lambda_1$ onto said first part of the scene.

At block 250, capturing a first IR image comprising IR image data values representing IR radiation emitted from a second part of the scene, wherein the second part of the real world scene at least partly overlaps with the first part of the scene. As described in the disclosure, the IR radiation emitted from a part of the scene is not limited to IR radiation emitted from the background and objects/substances in the scene, but rather may include reflected and/or transmitted IR radiation depending, for example, on the presence of IR radiation sources, e.g. IR light emitters, and/or the presence of objects/substances, e.g. gas, in the scene that may reflect and/or transmit IR radiation.

In various embodiments, a signal $S_n$ corresponding to an IR image captured by a thermal imaging device according to any of the embodiments described herein, can be described or approximated as: for n being an integer: $0 < n \leq N$ $$S_n = \text{Resp}_n * W_{bg\_n} + S_{off\_n} \quad (\text{Eq. 1})$$

wherein $W_{bg\_n}$ is the energy emitted from the background in the observed real world scene; $\text{Resp}_n$ is the response or responsivity of the thermal imaging device to the energy emitted from the background ($W_{bg\_n}$); and $S_{off\_n}$ is an offset value.

N is the number of pixels in an image, or a selected subset of the pixels of the image, to be processed. In other words, Eq. 1 may be used to calculate the signal for each of said N pixels, i.e. for the entire image or a selected subset of the image. In the remaining equations the index n is left out for easier readability. However, each of the equations relating to images/signals may be applied to one or more pixels, i.e. to each of the pixels of an image, or to each of the pixels in a selected subset of the image.

Figure 4A:
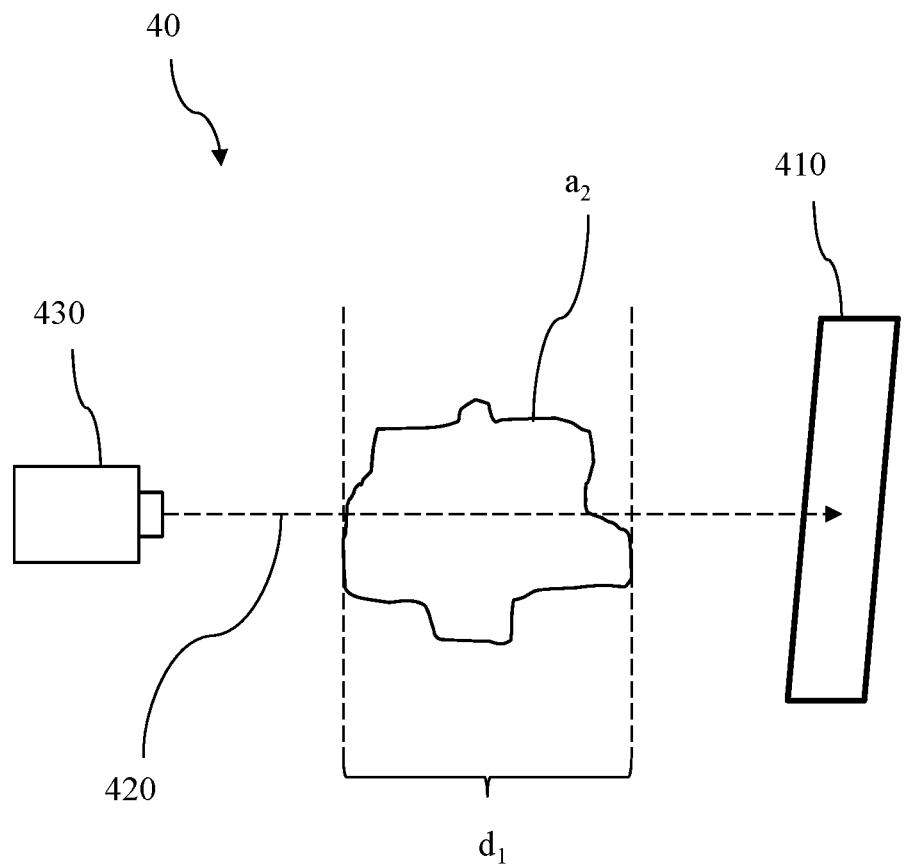
FIG. 4A is a sketch that shows an example of a real world scene with gas occurrence observed by a thermal imaging device, in accordance with one or more embodiments of the disclosure.
Figure 4B:
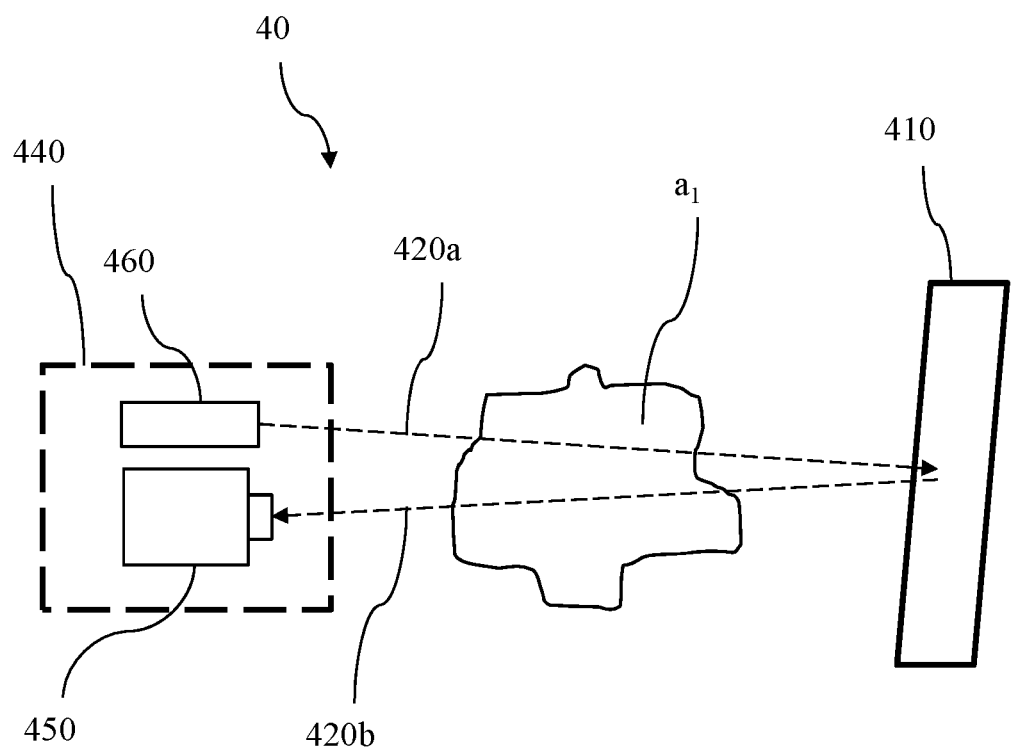
FIG. 4B is a sketch that shows an example of reflection of emitted light in a real world scene using an illuminator system and a thermal imaging device, in accordance with one or more embodiments of the disclosure.

In some embodiments, illustrated by the example of FIG. 4B, a thermal imaging device 440 comprises a light emitter 460 configured to emit light of the first wavelength $\lambda_1$ onto a real world scene 40, also referred to as scene 40. The direction of the emitted light from the light emitter 460 onto a background 410 of the scene 40 is indicated by the dashed arrow 420a. Assuming that there is gas present in the observed real world scene, illustrated as a gas cloud or area $a_1$ in FIG. 4B, said emitted light having an emitted energy, may pass through the gas in the observed real world scene, reflect against the background 410 and again pass through the gas cloud $a_1$ before it reaches one or more IR detectors, or IR detector elements of an IR imaging system 450 comprised in the thermal imaging device 440. The reflected light reaching the IR imaging system 450 is indicated by the dashed arrow 420b. According to these embodiments, a signal $S_{gas\_1}$ corresponding to an IR image captured by the thermal imaging device and comprising emitted and/or reflected light of wavelength $\lambda_1$, can be described or approximated as:

$$S_{gas\_1} = \text{Resp} * (\tau_{gas} * W_{bg} + (1-\tau_{gas}) * W_{gas} + (\tau_{gas}(\lambda_1))^2 * W_{light}(\lambda_1) + S_{off}) \quad (\text{Eq. 2})$$

where $W_{light}(\lambda_1)$ is the light of wavelength $\lambda_1$ that is reflected from the background; and $\tau_{gas}$ is the transmittance of light within the range of wavelengths that the IR imaging system used is configured to detect. The term $(1-\tau_{gas}) * W_{gas}$ is the emitted radiation of the gas, and $(\tau_{gas}(\lambda_1))$ is the transmittance of the investigated gas for light having the wavelength $\lambda_1$.

At block 260, illuminating a third part of said observed real world scene, the third part at least partly overlapping with the first and second parts of the real world scene, by controlling a light emitter to emit light of a second wavelength $\lambda_2$ onto said third part of the observed real world scene. For example, in one or more embodiments, the second wavelength $\lambda_2$ may be selected as a wavelength having a local high or maximum absorption value of infrared radiation for the particular substance or gas. In one or more embodiments, a scene is investigated with the aim of finding one or more specified gases, and the wavelengths $\lambda_1$ and $\lambda_2$ may be selected such that: $\lambda_1$ is comprised in the absorption wavelength spectrum of one or more gases under investigation, and $\lambda_2$ is not comprised in the absorption wavelength spectrum of said one or more gases.

In one or more embodiments, the illuminator system controller may be configured to control the light emitter to switch between emitting light onto the same part of the observed real world scene of 1) the first wavelength $\lambda_1$ and 2) the second wavelength $\lambda_2$, or according to other embodiments presented herein, to switch between 1) emitting light of the first wavelength $\lambda_1$, 2) emitting light of the second wavelength $\lambda_2$, and 3) not emitting any light.

At block 270, capturing a second IR image comprising IR image data values representing IR radiation emitted from the second part of the observed real world scene.

Thus, according to one or more embodiments, the thermal imaging device may be configured to capture the following images: an image $S_{gas\ 1}$ while the light emitter emits light of the first wavelength ($\lambda_1$) onto the observed real world scene, and an image $S_{gas\ 2}$ while the light emitter emits light of a second wavelength ($\lambda_2$) onto the observed real world scene. The signal $S_{gas\ 2}$ is similar to the signal $S_{gas\ 1}$, with the difference that light of wavelength $\lambda_2$ is emitted onto the scene by the light emitter and captured in the IR image. Therefore, $S_{gas\ 2}$ may be described or approximated as:

$$S_{gas\ 2} = \text{Resp}*(\tau_{gas}*W_{bg} + (1-\tau_{gas})*W_{gas} + (\tau_{gas}(\lambda_2))^2 * W_{light}(\lambda_2) + S_{off}) \quad \text{(Eq. 3)}$$

where $W_{light}(\lambda_2)$ is the light of wavelength $\lambda_2$ that is reflected from the background, and ($\tau_{gas}(\lambda_2)$) is the transmittance of the investigated gas for light having the wavelength ($\lambda_2$). In one or more embodiments, the images $S_{gas\ 1}$ and $S_{gas\ 2}$ may be captured in close succession, for example as consecutive images in a series of captured image frames.

At block 280, detecting gas present in the observed real world scene, based on the first and second IR images, according to any of the method embodiments described herein.

As described herein, in one or more embodiments, the wavelength $\lambda_1$ is not comprised in the absorption spectrum of the gas to be detected, while the wavelength $\lambda_2$ is comprised in the absorption spectrum of the gas to be detected. Thus, gas can be detected by method embodiments comprising finding a predetermined relation between the image $S_{gas\ 2}$, captured during emission of light of the wavelength $\lambda_2$ comprised in the absorption spectrum, and the image $S_{gas\ 1}$, captured during emission of light of the wavelength $\lambda_1$ that is not comprised in the absorption spectrum. Gas can further be detected by method embodiments comprising finding a predetermined relation between the image $S_{gas\ 2}$, captured during emission of light of the wavelength $\lambda_2$ comprised in the absorption spectrum, and an image $S_{gas\ 0}$. Embodiments of such relations may be represented as a difference image D or a quota/transmission factor K, further described below.

In one or more embodiments, the generation of a difference image comprises controlling the light emitter not to emit light onto said first part of the scene; capturing a third IR image comprising IR radiation emitted from said second part of the scene, using the IR imaging system, wherein the third IR image represents the contribution of the IR radiation emitted from the background of the scene; and subtracting the third IR image from the first and second IR images, respectively, before generating a difference image based on the first IR image and the second IR image, as further described herein. A method according to these embodiments may comprise controlling a light emitter to not emit any light/be turned off, and may further comprise capturing the third IR image, hereinafter also referred to as image $S_{gas\ 0}$, while the light emitter is not emitting any light or is turned off, using the thermal imaging device. Correspondingly, in embodiments, the illuminator system controller may be configured to control a light emitter to not emit any light/be turned off, and the thermal imaging device may be configured to capture an image $S_{gas\ 0}$ while the light emitter is not emitting any light or is turned off.

If there is gas present in the observed real world scene, a signal $S_{gas0}$ corresponding to an IR image captured by the thermal imaging device, can be described or approximated as:

$$S_{gas0} = \text{Resp}*(\tau_{gas}*W_{bg} + (1-\tau_{gas})*W_{gas} + S_{off}) \quad \text{(Eq. 4)}$$

where $\tau_{gas}$ is the transmission factor of the gas and $(1-\tau_{gas})*W_{gas}$ is the emitted radiation of the gas. The image $S_{gas0}$ then corresponds to the contribution of the background radiation when no additional illumination of the observed real world scene, using a light emitter integrated in, connected to or coupled to the thermal imaging device, is performed.

In one or more embodiments, the relationship between the image/signal $S_{gas\ 1}$ and the image/signal $S_{gas\ 2}$ is defined as a quota or transmission factor K, wherein the signal $S_{gas0}$ representing the contribution of the background radiation has been removed from the image/signal $S_{gas\ 1}$ and the image/signal $S_{gas\ 2}$, respectively. Thus, any noise introduced by the background radiation and/or radiation from objects in the observed real world scene that may be interpreted as gas related information is removed, whereby the detection and quantification of gas is further improved. By using three or more images for gas detection, noise introduced by the IR imaging system is also reduced to different degrees, as the image degradation/noise introduction due to optical phenomena is compensated for/reduced through integration of more than two images.

Using an amplification factor $\text{Gain}_K$ for adjustment of the image/signal levels, K may be defined as:

$$K = \text{Gain}_K * \frac{(S_{gas\ 2} - S_{gas0})}{(S_{gas\ 1} - S_{gas0})} \quad \text{(Eq. 5)}$$

which may also be written as:

$$K = \text{Gain}_K * \frac{(\tau_{gas}(\lambda_2)^2 * W_{light}(\lambda_2))}{(\tau_{gas}(\lambda_1)^2 * W_{light}(\lambda_1))} \quad \text{(Eq. 6)}$$

The amplification factor $\text{Gain}_K$, which is applied to the emitted light to control the output signal levels, is determined in calibration, either in production or during use of the thermal imaging device. The calibration is performed under conditions where there is no gas present in the observed real world scene ($\tau_{gas}=1$ for all wavelengths), or using a part of a captured image wherein it is known that there is no gas present, and $\text{Gain}_K$ is under these circumstances adjusted such that K=1 meaning that $\text{Gain}_K$ may be described as:

$$\text{Gain}_K = \frac{(W_{light}(\lambda_1))}{(W_{light}(\lambda_2))} \quad \text{(Eq. 7)}$$

which gives the relationship $$K = \left(\frac{\tau_{gas}(\lambda_2)}{\tau_{gas}(\lambda_1)}\right)^2 \quad \text{(Eq. 8)}$$

At block 290, quantifying the detected gas present in the observed real world scene based on the first and second IR images. Embodiments for quantification of gas present in the observed real world scene are described below. In embodiments, quantification of any gas present in an observed real world scene comprises estimating/calculating the amount of gas present in the observed real world scene. The processor 112 may be configured to estimate/calculate the amount of gas present in the observed real world scene.

In one or more embodiments, the quantification of the detected gas comprises generating a difference image, gas image, and/or quota/transmission factor based on said first IR image and said second IR image, wherein said difference image, gas image, and/or quota/transmission factor is indicative of gas present in the scene; and quantifying the detected gas present in the real world scene based on said generated difference image, gas image, and/or quota/transmission factor. If a difference image, gas image, and/or quota/transmission factor based on said first IR image and said second IR image has already been generated in the detection block 280, the same difference image, gas image, and/or quota/transmission factor may be used for the quantification, whereby no new generation of such a difference image, gas image, and/or quota/transmission factor needs to be performed in this block.

In some embodiments further described below, the concentration of gas η present in an observed real world scene is estimated and/or calculated based on a gas concentration length GCL. The term GCL is in the present disclosure to be understood as the concentration of a gas (in a concentration measurement unit, e.g. ppm), present in a real world scene, multiplied by the length (in a length measurement unit, e.g. meters) of a physical area in the scene that comprises detected gas, as seen in the direction from a measurement device, for example from a detector of a thermal imaging device towards a background of the observed real world scene.

Figure 3A:
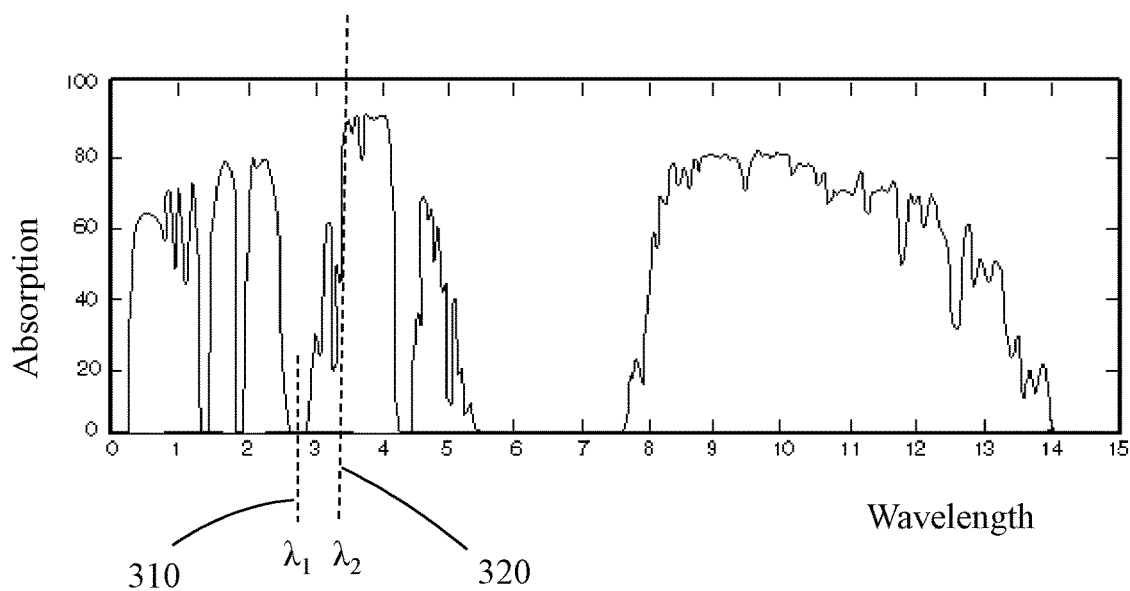
FIGS. 3A and 3B show graphs illustrating example absorption spectra of gases, in accordance with one or more embodiments of the disclosure.
Figure 3B:
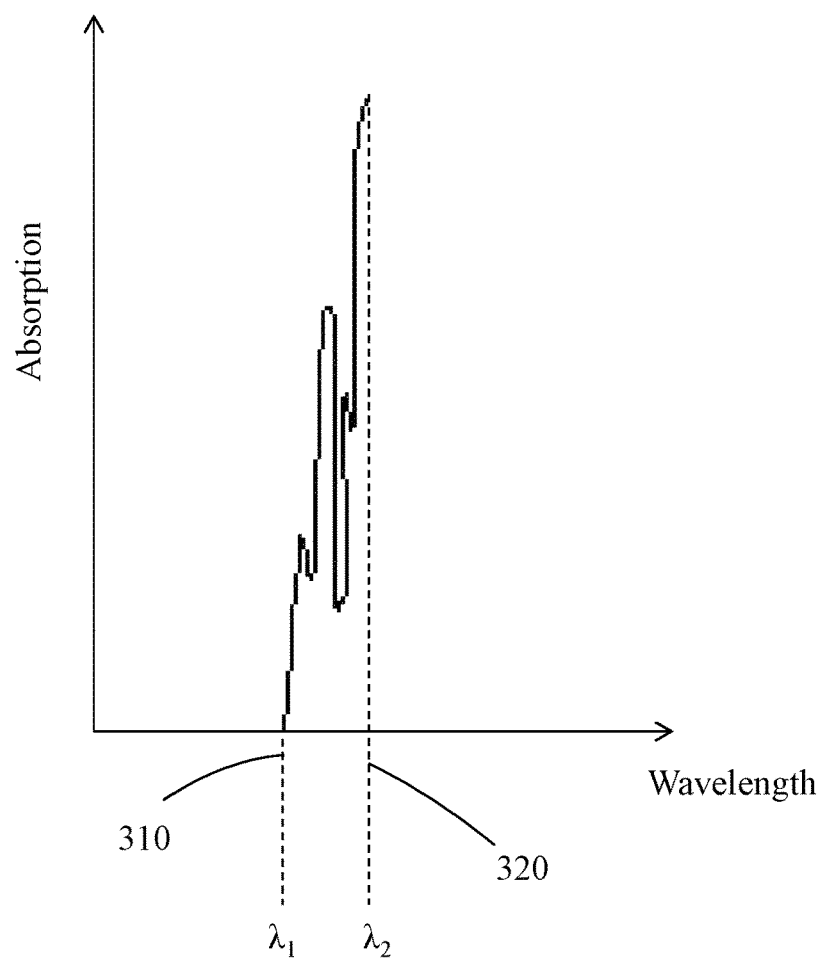

FIGS. 3A and 3B show graphs of absorption spectra for an exemplifying gas. The graph in FIG. 3B is an enlargement of a part of the graph in FIG. 3A. In the graphs, wavelength values on the X-axis are plotted against absorption values on the Y-axis. The gas has a low absorption value for a first wavelength $\lambda_1$ 310, which for example may be at least a local minimum absorption value for this gas. Illuminating the gas with an illuminating light from the illumination system 119 having the first wavelength $\lambda_1$ will result in a low absorption of the illuminating light by the gas. Further, the gas has a high absorption value for a second wavelength $\lambda_2$ 320, which for example may be at least a local maximum absorption value for this gas. Illuminating the gas with an illuminating light from the illumination system 119 having the second wavelength $\lambda_2$ will result in a high absorption of the illuminating light by the gas.

Operating the illumination system 119 comprises, in one or more embodiments as described herein, controlling the light emitter 193 to emit light with a first wavelength $\lambda_1$ or with a second wavelength $\lambda_2$ onto the real world scene. The wavelength of the emitted light may be controlled based on a set-point obtained by the control unit 195 as a wavelength data value and on a control signal relation based on a characteristic of the light emitter 193. In embodiments, the control signal relation may describe a relationship between the emitted light wavelength and a light emitter control current provided as the control signal to the light emitter 193.

The wavelength data value indicating the set-point for the emitted wavelength may for example be obtained by or communicated to the control unit 195 of the illuminator system 195 from a processor or retrieved from a memory 180 of the illuminator system 119. In one or more embodiments, the control unit 195 or the processor 112 determines a wavelength data value based on a control signal relation for example in the form of an absorption spectrum. The control signal relation may be stored as a look-up table (LUT) in the memory 180 of the illuminator system 119 or in the memory 115 of the thermal imaging device 110. The look-up table LUT may for example comprise value pairs comprising one or more wavelength values and one or more absorption values, preferably in relation to a control signal parameter for example a control current or any other control signal parameter described herein.

For many gases, the ability to absorb infrared radiation depends on the wavelengths of the radiation. In other words, their degree of transparency to IR radiation from, for example, laser light varies with the wavelengths of the radiation, for example, by the illuminating light. There may be IR wavelengths where gases are essentially opaque due to absorption. Physical property databanks exist containing infrared absorption data for many substances. To determine the infrared absorption spectrum for a gas, a sample is placed in an Infrared Spectrometer and the absorption, or transmission, of infrared radiation is measured at different wavelengths. The resultant absorption data are normally represented as graphs, also referred to as absorption spectra that may be used for a control signal relation. Such graphs are generally represented as a light absorption value along an X-axis representing light wavelength values, as in FIG. 3A-3B, however light transmission values can be used in a similar manner.

In embodiments comprising generating gas representing images, the light emitter 193 is controlled to emit the first wavelength $\lambda_1$ and the second wavelength $\lambda_2$ such that they correspond to absorption wavelengths for infrared radiation for a certain gas, for example a gas targeted for detection in the gas imaging. In embodiments, a gas representing image is generated based on a first IR image and a second IR image captured with different illuminating light conditions. A gas representing image may be generated as a difference image based on the first IR image and the second IR image, wherein IR image data values of the first IR image are subtracted by IR image data values of the second IR image.

In embodiments, the first image may represent gas occurrence with a low degree of light absorption at the first wavelength $\lambda_1$, for example a local minimum absorption. Further, the second image may represent gas occurrence with a high degree of light absorption at the second wavelength $\lambda_2$, for example a local maximum absorption. In such embodiments, the relation between a low absorption wavelength and a high absorption wavelength and the corresponding IR images may be used combined to detect a more complex absorption characteristic of a specific gas. By including first and second wavelengths for multiple gases, a wide range of gases may be detected.

In other embodiments, the first image may again represent gas occurrence with a low degree of light absorption at the first wavelength $\lambda_1$, such as normal air (e.g., atmospheric air). The second image may represent gas occurrence with a high degree of light absorption at the second wavelength $\lambda_2$, for example a local maximum absorption at a certain wavelength that is a typical characteristic for a specific gas.

Embodiment methods of the disclosure comprise capturing a first IR image of the scene being illuminated with light at a first wavelength $\lambda 1$, capturing a second IR image of the scene illuminated with light at a second wavelength $\lambda 2$, and comparing the first and second IR images to determine whether a characteristic for a specific gas is represented in the first and second IR images. In embodiments, the comparison comprises generating a difference image based on the first and the second IR images, e.g. by subtracting data values of said second IR image from data values of said first IR image.

In embodiments, generating a gas representing image based on an IR image may comprise determining or setting the gas representing image data values to be equal to specified IR image data values, such that the captured IR image can be interpreted as a gas representing image by interpreting differences in intensity when gas is present. By illuminating the observed real world scene with light having an first wavelength exhibiting low absorption by a particular gas or substance, and subsequently with light having a second wavelength with high absorption by the particular gas or substance, the difference in intensity may be improved and therefore improve sensitivity of the thermal imaging device. In embodiments, the generation of a difference image, or a gas representing image, may further include controlling or switching the emitted light off and capturing a third IR image. As the third image represents infrared energy emitted by objects in the observed real world scene when the scene is not actively illuminated, the difference or delta in intensity, and therefore the sensitivity to imaging low concentrations of gas, may be improved by subtracting data values of the third IR image from the first and second IR image. Method embodiments of the disclosure comprise controlling the illuminator to turn off illumination of the scene, capturing a third IR image of the non-illuminated scene, and comparing said first, second and third IR images to determine whether a characteristic for a specific gas is represented in said first and/or second IR images. The comparison may for example comprise generating a difference image based on said first, said second and said third IR images.

An exemplifying embodiment of the operation of a thermal imaging device and an illuminator as shown in FIG. 1 is generally as follows.

The processor 112 sends a first wavelength control value as a control signal to the illuminator system control unit 195. The illuminator system control unit 195 is configured to control laser light emitter cooling unit 196 to cool said laser light emitter 193 based on said laser light emitter cooling unit control current, to control or switch the light emitter on or off and to control the light emitter to emit laser light at a primary output with a first wavelength $\lambda_1$. The first wavelength is for example selected to correspond to a local minimum absorption wavelength for infrared radiation for a specific selected gas.

The illuminator system 119 thus emits light with the first wavelength $\lambda_1$ onto said real world scene. Infrared energy, comprising light with the first wavelength $\lambda_1$ reflected from the observed real world scene and infrared energy emitted by objects in the observed real world scene, is received via said infrared optical system 1131 and is directed onto the IR detector elements 1132. Each detector element responds to the infrared radiation or heat energy received and generates an output signal captured as a data value. A first IR image in the form of a frame of infrared (IR) image data values may, for example, be captured by scanning all the rows and columns of the detector and, in some embodiments, analog to digital converted to obtain a captured first IR image wherein data values associated to each detector element is referred to as an IR image pixel having an associated row and column index.

The processor 112 further sends a second wavelength control value as a control signal to the illuminator system control unit 195 configured to control laser light emitter cooling unit 196 to cool said laser light emitter 193 based on said laser light emitter cooling unit control current, to control the light emitter to emit laser light at a primary output with a second wavelength $\lambda_2$ representing a local maximum absorption wavelength for infrared radiation for said gas. The illuminator system 119 thus emits light with a second wavelength $\lambda_2$. The second wavelength is for example selected to corresponding to a local maximum absorption wavelength for infrared radiation for the selected gas.

The illuminator system 119 thus emits light with the second wavelength $\lambda_2$ onto said real world scene. Infrared energy, comprising light with the second wavelength $\lambda_2$ that is reflected from the observed real world scene and infrared energy that is emitted by objects in the observed real world scene is received via said infrared optical system 1131 and directed onto the IR detector elements 1132. A second IR image in the form of a frame of infrared (IR) image data values is captured in a similar manner.

A difference image may then be generated by the processor 112 as a gas representing image based further on said first IR image and said second IR image, indicating the presence of gas. In further embodiments adapted to compensate for background radiation, the thermal imaging device 110 and the illuminator system 119 are controlled in a similar manner to control or switch the light emitter off based on the wavelength control value. A third IR image is captured when the illumination is turned off, and a difference image is then generated by the processor 112 as a gas representing image based on said first IR image, said second IR image and said third IR image, indicating the presence of gas. In one example, this may be performed by subtracting image data values of said second IR image and of said third IR image from said first IR image. In this way, the difference image representing image data values indicative of light with a first wavelength $\lambda_1$ reflected from the observed real world scene subtracted from reflected light with a second wavelength $\lambda_2$ may be further improved by subtracting infrared energy emitted by objects in the observed real world scene represented by image data values of said third image.

Figure 3C:
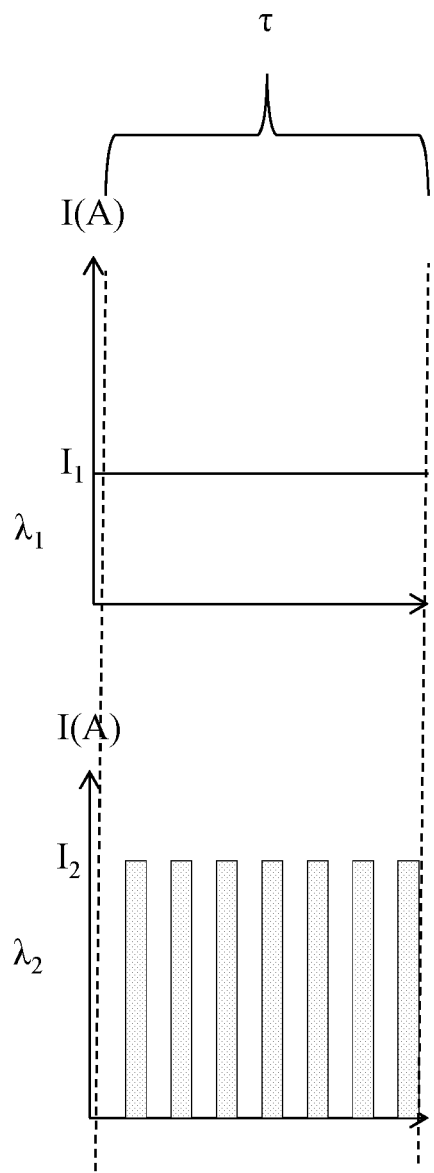
FIGS. 3C and 3D show graphs illustrating example amplitudes and pulse widths for a light emitter control current, in accordance with one or more embodiments of the disclosure.
Figure 3D:
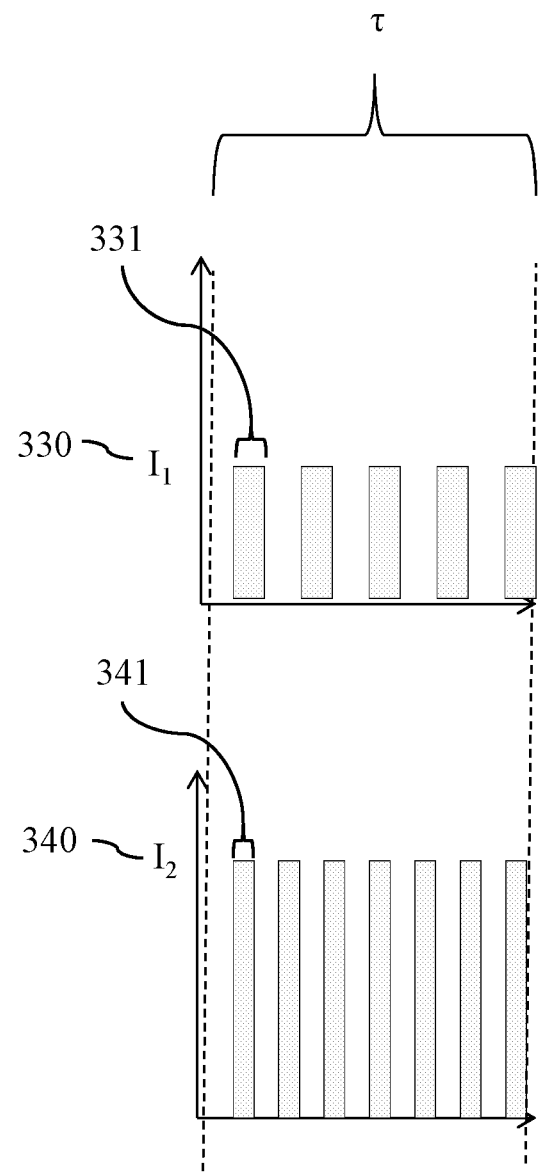

FIGS. 3C and 3D show graphs illustrating one or more embodiments as described herein where the control unit 195 of the illuminator system 119 is configured to operate with control signals comprising signal pulses having controllable amplitude and width. For example, as illustrated with FIGS. 3C and 3D, a light emitter 193 comprising a laser is controlled with a first laser control current amplitude $I_1$ 330 and a first laser control current pulse width 331 for a first wavelength $\lambda_1$. The laser light emitter is further controlled with a second laser control current amplitude $I_2$ 340 and a second laser control current pulse width 341 for a second wavelength $\lambda_2$. The first and second amplitudes and pulse widths, respectively, are selected, generated and/or determined based on a control signal relation for pulse control describing the relation between the control pulse characteristics and the wavelength characteristics of the light emitter to enable the light emitter to emit light at a controllable wavelength. In embodiments, a cooling unit control current amplitude and a cooling unit control current pulse width may optionally be determined in a similar manner, thus enabling the light emitter to emit light at a controllable operating temperature and thereby a controllable wavelength.

In embodiments, the illuminator system is controlled with pulse width modulation such that a substantially equal amount of energy is emitted during a time period $\tau$ for each of said first and second wavelengths, wherein the time period $\tau$ is selected to correspond to the time constant of an IR detector of the thermal imaging device. When the light emitter of the illuminator system can be pulsed at a high frequency, for example in the MHz (MegaHertz) frequency range, and the time constant $\tau$ of the IR detector is small, also called slow, typically less than 100 Hz, for example 60-70 Hz, the IR detector integrates the pulse such that the output signal from the IR detector is even. This has the effect that the IR detector perceives the received radiation signal at a high level in the absence of gas, i.e. when none or little of the emitted light is absorbed by gas.

Embodiments comprising illumination as described herein, for example by a laser light emitter, thus enable gas imaging with improved sensitivity when using a thermal imaging system with a detector not requiring cooling to cryogenic temperatures, e.g. a micro bolometer. This results in reduced complexity, size, weight, manufacturing cost and overall power consumption.

In the example illustrated in FIG. 3C, a laser control current amplitude and laser control current pulse width based on the control signal relation for pulse control for a first wavelength $\lambda_1$ is illustrated in the top diagram, where the laser control current amplitude is determined to $I_1$ and the pulse width to infinite $\infty$ or continuous during a time constant $\tau$. The bottom diagram of illustrates another example of a laser control current amplitude and a laser control current pulse width based on the control signal relation for pulse control for a wavelength $\lambda_2$ where the laser control current amplitude is determined to $I_2$ and the pulse width to approximately $\tau/14$, i.e. time constant $\tau$ divided by 14.

The top diagram of FIG. 3D illustrates another example of a laser control current amplitude 330 and laser control current pulse width 331 based on the control signal relation for pulse control for a first wavelength $\lambda 1$, where the laser control current amplitude 330 is determined to $I_1$ and the pulse width 331 to approximately $\tau/10$, i.e. time constant $\tau$ divided by 10. The bottom diagram of FIG. 3D illustrates another example of determining a laser control current amplitude 340 and a laser control current pulse width 341 based on the control signal relation for pulse control for a second wavelength $\lambda_2$, where the laser control current amplitude 340 is determined to $I_2$ and the pulse width 341 to approximately $\tau/14$, i.e. time constant $\tau$ divided by 14. The lower control current amplitude value $I_1$ may for example be kept continuous during the time constant $\tau$, as in top graph of FIG. 3C. The control current pulse width value may then be calculated as:

$$\frac{I_1}{I_2} = \frac{\text{DUTY CYCLE}_1}{\text{DUTY CYCLE}_2} = \frac{1}{\text{DUTY CYCLE}_2} \Rightarrow \text{DUTY CYCLE}_2 = \frac{1*I_2}{I_1},$$

where the duty cycle is a percentage of one period, e.g. $\tau$, in which the laser is active. Thus, a 60% duty cycle means the signal is on 60% of the time and off 40% of the time during one period. The duty cycle may be divided into several pulses, or active periods, with a certain pulse width, for example seven pulses as shown in the bottom graphs of FIGS. 3C and 3D. In an example shown in the top graph of FIG. 3D, the lower control current amplitude value $I_1$ is pulsed with five pulses, where the first control current pulse width may be calculated as:

$$PW_1 = \frac{\tau * \text{DUTY CYCLE}_1}{NoActivePeriods_1}, \text{ e.g. } \tau/10.$$

Similarly, the second control current pulse width may be calculated as:

$$PW_2 = \frac{\tau * \text{DUTY CYCLE}_2}{NoActivePeriods_2}, \text{ e.g. } \tau/14.$$

Selection of Gas

In one or more embodiments, illumination wavelengths are selected based on gas absorption wavelengths and/or absorption characteristics for infrared radiation for a gas. In embodiments, the one or more gases that are detected and quantified using methods and systems disclosed herein include but are not limited to a selection of the following: Acetic Acid, Acetone, Acetonitrile, Acrolein, Acrylic acid, Acrylonitrile, Amyl Acetate, Aniline, Benzene, Benzyl Chloroformate, 2,6-di-tert.-butyl-p-cresol (BHT), 1-Bromo-3-Chloropropane, Butadiene, Butane, 1-Butene, 1,3 Butadiene, n-Butanol, 2-Butanol, t-Butanol, Butyl acetate, n-Butyl Acetate, Chlorine, Chlorobenzene, Cumene, Cyclohexanone, Cyclohexyl Isocyanate, R-12/Dichlorodifluoromethane, Diethylene glycol, R-22/Difluorochloromethane, Dimethyl Disulfide, Dimethyl Acetamide, Dimethyl Formamide, Dimethyl Sulfide, Dimethyl Sulfoxide, Epichlorohydrin, Ethane, Ethanol, Ethene, 2-Ethyl-1,3-Hexanediol, Ethyl Acetate, Ethyl Acrylate, Ethyl Cyanoacetate, Ethyl Ester, Ethyl Hexanol, Ethyl Hexyl Acrylate, 2-Ethylhexyl Acrylate, Ethylene, Ethylene Dichloride, Ethylene Oxide, Ethyl Acetate, Ethyl-benzene, R-21/Fluorodichloromethane, Formaldehyde, Glycol Ethers, Halon 1301/Bromotrifluoromethane, Heptane, n-Heptane, Hexane, n-Hexane, Hexamethylene diisocyanate (HDI), Hydrazine, Hydrochloric Acid, Hydrogen Chloride, Isoprene, Isopropanol, Isoamyl Alcohol, Isopropylether, Di-iso-propylamine, Di-n-Propylamine, Maleic Anhydride, MDI (Methylene diphenyl diisocyanate), Methane, Metanethiol, Methanol, Methyl Chloride, Methyl Disulfide, Methyl Ethyl Ketone, Methyl Mercaptan, Methyl Sulfide, Methyl t-Butyl Ether, Methylene Chloride, MIBK, MEK, Monoethanolamine, PDC, Pentane, 1-Pentene, Phenol, Phosgene, 2-(1-Methoxy) propyl acetate, 2-Propenal, n-Propanol, Propane, 1-Propene, 2-Propenoic acid, Propylene, Propylene Oxide, n-Propyl Acetate, n-Propylamine, Octane-branched (aka Iso-Octane or 2,2,4 trimethylpentane), Sodium Methylate, Styrene, Tetrahydrofuran, t-Methyl Ortho Acetate, t-Methyl Ortho Formate, Toluene, Toluene Diamine, Triethanolamine, Triethylamine, Trifluoroacetic Acid, Trifluoroacetic Anhydride, Trimethylolpropane, Vinyl Acetate, Vinyl Chloride, Xylene.

Generating a Gas Representing Image

The disclosure comprises various embodiments for generating a gas representing image. As described in the disclosure, an observed real world scene is illuminated by an illuminator system with light of a first wavelength, indicative of an absorption wavelength for infrared radiation for a gas. One or more IR images may then be captured, an occurrence of gas may be detected based on image signal levels, and optionally presented as a gas representing image to a user, using false coloring techniques. As explained, the light emitted by the illuminator system will be reflected back towards the IR imaging system and cause areas containing gas to appear for example with higher contrast in a generated gas representing image.

In one or more embodiments, the gas representing image may be a scaled version of the one or more IR images, e.g. by averaging or interpolation of IR image data values, as would be understood by a skilled person. In one or more embodiments, the generating of a gas representing image may further comprise filtering the gas representing image, e.g. by low pass filtering, high pass filtering, band pass filtering, or any other filtering as would be understood by a skilled person.

In one or more embodiments, the generation of a gas representing image may further comprise generating a contrast enhanced gas representing image, wherein the generation of a contrast enhanced gas representing image comprises: capturing a visible light VL image of the observed real world scene; aligning the gas representing image and the VL image; processing the VL image by extracting the high spatial frequency content of the VL image, e.g. by high pass filtering the VL image using a spatial filter; and combining the extracted high spatial frequency content of the captured VL image and the gas representing image to a contrast enhanced gas representing image.

In one or more embodiments, the combining of the extracted high spatial frequency content of the captured VL image and the gas representing image to a contrast enhanced gas representing image comprises using only the luminance component Y from the processed VL image, thereby increasing contrast in the gas representing image.

In one or more embodiments, combining the extracted high spatial frequency content of the captured VL image and the gas representing image to a contrast enhanced gas representing image comprises combining the luminance component of the extracted high spatial frequency content of the captured VL image with the luminance component of the gas representing image. As a result, the colors or greyscale components of the gas representing image are not altered and the properties of the original gas palette is maintained, while at the same time the desired contrasts are added to the contrast enhanced gas representing image. It is beneficial to maintain the gas representing image palette through all stages of processing and display, since the gas representing image data values may be kept throughout the process, thereby facilitating the interpretation of the contrast enhanced gas representing image for the user.

IR Image in Signal Representation

In embodiments describing IR images in a signal representation, a signal $S_n$ corresponds to an IR image captured by a thermal imaging device according to any of the embodiments described herein.

In embodiments, the thermal imaging device may be configured to capture the following images. An image $S_{gas\ 1}$ is captured while the light emitter emits light of the first wavelength ($\lambda_1$) onto the observed real world scene, and an image $S_{gas\ 2}$ is captured while the light emitter emits light of a second wavelength ($\lambda_2$) onto the observed real world scene. The signal $S_{gas\ 2}$ is similar to the signal $S_{gas\ 1}$, with the difference that light of wavelength $\lambda_2$ is emitted onto the scene by the light emitter and captured in the IR image. Therefore, $S_{gas\ 1}$ and $S_{gas\ 2}$ may be respectively described or approximated as Equations 2 and 3 introduced above.

The images $S_{gas\ 1}$ and $S_{gas\ 2}$ are preferably captured in close succession, for example as consecutive images in a series of captured image frames. The reason for capturing the images close in time is that the depicted real world scene will not have changed significantly from image to image.

In one or more embodiments, the generation of a gas representing image comprises generating a difference image, a gas representing image, and/or a quota/transmission factor based on said first IR image and said second IR image, wherein said difference image, gas representing image and/or quota/transmission factor is indicative of gas present in the scene.

In one or more embodiments, the wavelength $\lambda_1$ may represent a lower absorption value of the gas to be detected, while the wavelength $\lambda_2$ may represent a higher absorption value of the gas to be detected. Thus, gas can be detected by method embodiments comprising finding a predetermined relation between the image $S_{gas\ 2}$, captured during emission of light of the wavelength $\lambda_2$, and the image $S_{gas\ 1}$, captured during emission of light of the wavelength $\lambda_1$. Gas can further be detected by method embodiments comprising finding a predetermined relation between the image $S_{gas\ 2}$, captured during emission of light of the wavelength $\lambda_2$ comprised in the absorption spectrum, and an image $S_{gas\ 0}$ having no indication of gas. Embodiments of such relations may be represented as a difference image D or a quota/transmission factor K, further described below.

In some embodiments, a difference image D is generated by subtracting the image $S_{gas\ 1}$ from the image $S_{gas\ 2}$:

$$D = S_{gas\ 2} - S_{gas\ 1} \qquad (\text{Eq. 9})$$

In some embodiments, a difference image D is generated by subtracting the image $S_{gas\ 2}$ from the image $S_{gas\ 1}$:

$$D = S_{gas\ 1} - S_{gas\ 2} \qquad (\text{Eq. 10})$$

In one or more further embodiments, an amplification factor $Gain_D$ may be applied to the light emitter 193 for adjustment of the effect of the emitted light, and hence also affecting the levels of the captured images/signals. In embodiments, the light emitter 193 is thus configured to emit light dependent on an amplification factor $Gain_D$, e.g. controlled by the illuminator system controller 195. The light emitter 193 is configured to be turned on or off, or the effect of the emitted light may be adjusted, dependent on or based on the amplification factor $Gain_D$. The amplification factor $Gain_D$ may for example be a damping filter that lowers the output effect of the light emitter 193.

Using an amplification factor $Gain_D$, equation 9 above may be rewritten as:

$$D = Resp * (Gain_D * \tau_{gas}(\lambda_2)^2 * W_{light}(\lambda_2) - \tau_{gas}(\lambda_1)^2 * W_{light}(\lambda_1)) \qquad (\text{Eq. 11})$$

The amplification factor $Gain_D$, which is applied to the emitted light to control the output signal levels, is determined in calibration, either in production or during use of the thermal imaging device. The calibration is performed under conditions where there is no gas present in the observed real world scene ($\tau_{gas} = 1$), or using a part of a captured image wherein it is known that there is no gas present. The amplification factor $Gain_D$ is under these circumstances adjusted such that D=0, meaning that $Gain_D$ may be described as:

$$\text{Gain}_D = \frac{W_{light}(\lambda_1)}{W_{light}(\lambda_2)} \qquad \text{(Eq. 12)}$$

By calibrating the thermal imaging device, more accurate measurements and calculations may be obtained.

If there is gas present in the observed real world scene, and the gas has different absorption for the wavelengths $\lambda_1$ and $\lambda_2$, the difference image D will not be 0 for all its calculated values/pixels. In other words, the difference image D will in this case comprise information on detected gas and the location of the detected gas with relation to the observed real world scene.

An improved difference image may be obtained by subtracting (static) background information in the form of a further IR image from the difference image. Thus, only gas representing information is present in the improved difference image, whereby any gas present in the observed real world scene can be more easily detected from the difference image, or more easily seen by an observer in a visual representation of the difference image.

Quantifying Detected Gas

FIG. 4A shows an example of an observed real world scene 40 with a gas comprising area $a_2$ of length $d_1$ from one outer end of gas comprising area $a_2$ to the opposite outer end of area $a_2$, as seen in the direction from a measurement device 430 in the form of a thermal imaging device according to various embodiments of the disclosure, and looking towards a background 410 of the observed real world scene 40. The direction from the measurement device 430 towards the background 410 is indicated by a dashed arrow 420. If the concentration η of a gas present in the scene 40 is known, the gas concentration length (GCL) may thus be calculated as:

$$\text{GCL} = \eta \times d_1 \qquad \text{(Eq. 13)}$$

where $d_1$ is expressed in meters or in other suitable units of measurement. Alternatively, if the gas concentration length (GCL) is known, the concentration τ may be calculated as:

$$\eta = \frac{GCL}{d_1} \qquad \text{(Eq. 14)}$$

In some embodiments, a value for length $d_1$ is input to the system by an operator of the thermal imaging device, using an input device. In some embodiments, a value for length $d_1$ is input by an operator of an external processing device, using an input device of the external processing device. In some embodiments, length $d_1$ is measured using a distance measuring device (e.g., a rangefinder) integrated in, connected to or communicatively coupled to the thermal imaging device. In some embodiments, length $d_1$ is determined based on captured image data, using image processing methods. The processor 112 may be configured to perform image processing on captured image data to determine length $d_1$.

Some embodiments comprise receiving, from an input device of the thermal imaging device, user input information indicative of the distance to the gas detected in the observed real world scene, and estimating length $d_1$ of the gas cloud/gas comprising area detected in the observed real world scene as illustrated in FIG. 4A based on the input distance to the gas cloud and captured image data. The processor 112 may be configured to receive user input information from an input device indicative of the distance to the gas detected in the observed real world scene, and to estimate length $d_1$ of the gas cloud detected in the observed real world scene based on the input distance to the gas cloud and captured image data.

Furthermore, if the velocity (v) with which the detected gas is moving can be determined, the gas flow (GF) can be derived from the GCL, in addition to or as an alternative to determination of the gas concentration η, according to the following, where D is a difference image signal:

$$GF = \frac{\pi}{4} * D^2 * v * \eta = \frac{\pi}{4} * D * v * GCL \qquad \text{(Eq. 15)}$$

One or more method embodiments comprise calculating GF based on a value for GCL and the velocity v, e.g. using the relationship of equation 15. In embodiments, the processor 112 is configured to calculate GF based on a value for GCL and the velocity v, e.g., using the relationship of equation 15.

In some embodiments, the method comprises estimating the velocity v through image processing operations, wherein the image processing operations may comprise detecting a gas pattern and tracking the gas pattern in a sequence of captured IR image frames.

Techniques for Determining GCL Via a Relation Between GCL and K

Figure 5A:
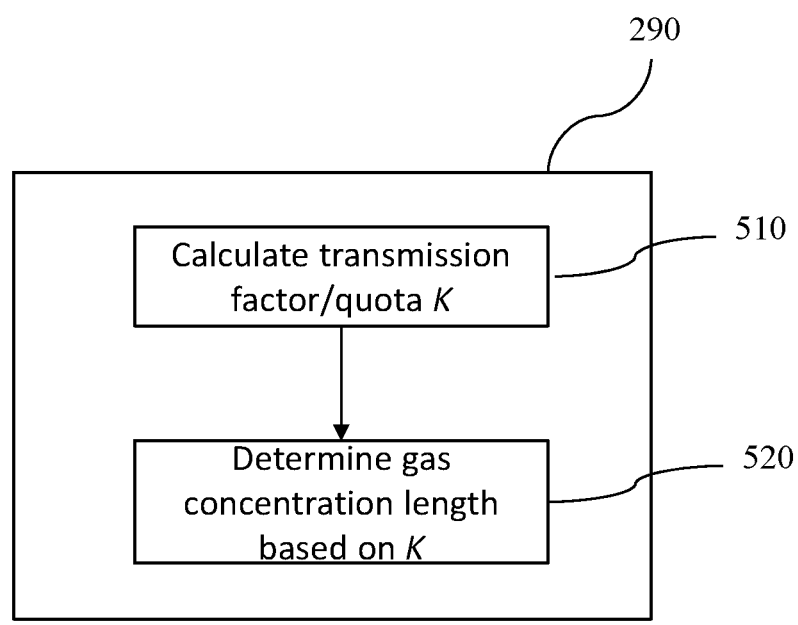
FIG. 5A shows a flow diagram of sub-blocks of block 290 of FIG. 2B, in accordance one or more embodiments of the disclosure.

FIG. 5A is a flow diagram of sub-blocks of block 290 of FIG. 2B, in accordance one or more embodiments of the disclosure, wherein the transmission factor/quota K is converted to a GCL value. The method of FIG. 5A comprises:

At block 510, calculating a value for K.

At block 520, determining a GCL value based on the value for K calculated in block 510.

Block 510 may comprise calculating a value for K, according to any of the embodiments described herein. For example, the transmission factor/quota K may be calculated using equation 8, wherein the amplification factor $\text{Gain}_K$ has been determined in calibration during production or operation of the thermal imaging device, as described in connection with equation 7.

Alternatively, in one or more embodiments, K may for example be calculated in different ways using equations 5 through 8. In such examples, block 510 further comprises retrieving values for one or more transmission coefficients $\tau(\lambda_i)$ of the investigated gas for the desired wavelengths $\lambda_i$, for example the first wavelength $\lambda_1$ and the second wavelength $\lambda_2$, using look-up tables or other pre-stored information from a memory or database integrated in, connected with, or communicatively coupled to the thermal imaging device. The calculation of one or more transmission coefficients $\tau(\lambda_i)$ may in these embodiments be performed in production and/or calibration of the thermal imaging device. In various embodiments, the values for one or more transmission coefficients $\tau(\lambda_i)$ may be calculated according to any of the embodiments of FIG. 5B as further discussed herein below.

If the light beam emitted by the light emitter is narrow, for example in the case of a laser light emitter, $\tau(\lambda_i)$ for the wavelength $\lambda_i$ can be derived using Beer's law according to the following:

$$\tau(\lambda_i) = \exp(-\alpha(\lambda_i) * GCL) \qquad \text{(Eq. 16)}$$

where $\alpha(\lambda_i)$ is the absorption coefficient for an investigated gas for the wavelength $\lambda_i$.

In embodiments comprising using equation 16, block 520 of determining a GCL value based on the value for K calculated in block 510 may further comprise retrieving values for one or more absorption coefficients $\alpha(\lambda_i)$ of the investigated gas for the desired wavelengths, for example the first wavelength $\lambda_1$ and the second wavelength $\lambda_2$, from a look-up table or other pre-stored information, from a memory or database integrated in, connected with, or communicatively coupled to the thermal imaging device. The calculation of one or more transmission coefficients $\tau(\lambda_i)$ using equation 16 may in these embodiments be performed in production and/or calibration of the thermal imaging device. In embodiments, the values for one or more transmission coefficients $\tau(\lambda_i)$ are calculated according to any of the embodiments presented above.

Equation 8 may then be reformulated as:

$$GCL = \frac{\log(K)/2}{(\alpha(\lambda_1) - (\alpha(\lambda_2))} \quad \text{(Eq. 17)}$$

thereby rendering a GCL value based on the relation between GCL and K.

An advantage of these embodiments of block 520 is that the proposed determination of GCL is computationally inexpensive and therefore may be performed during operation of the thermal imaging device, even in real time. The calculations may also, additionally or as an alternative, be performed in post processing in the thermal imaging device or in an external processing device.

In some embodiments, block 520 of determining a GCL value based on the value for K comprises retrieving a value for GCL from a look-up table or other pre-defined description comprising relations, or mappings, between one or more values for GCL corresponding values for K.

An advantage of embodiments wherein determining a GCL value based on the value for K comprises retrieving a value for GCL from a look-up table or other pre-defined description comprising relations, or mappings, between one or more values for GCL and corresponding values for K is that determination of GCL is very computationally inexpensive, as it only requires mapping in and retrieval of values from a pre-stored relation database or the like, and may be performed during operation of the thermal imaging device, even in real time. The calculations may also, additionally or as an alternative, be performed in post processing in the thermal imaging device or in an external processing device. Another advantage is that determination of GCL according to these embodiments can be performed for a thermal imaging device comprising any type of light emitter.

An overall advantage of the method embodiments described herein is that quantification of gas is enabled using image data captured by an un-cooled detector, and thereby permitting low complexity and inexpensive thermal imaging device to be used.

Figure 5B:
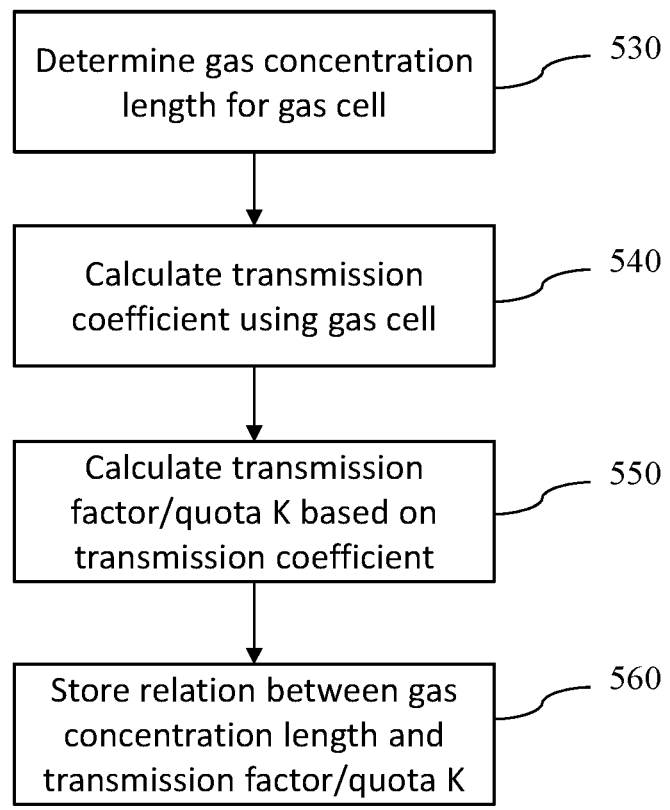
FIG. 5B shows a flow diagram of a method for generating a look-up table, in accordance with one or more embodiments of the disclosure.

FIG. 5B shows a flow diagram of a method for generating a look-up table or other pre-calculated information comprising a relation, or mapping, between one or more values for GCL corresponding values for K, according to one or more embodiments of the disclosure. In the method of FIG. 5B according to various embodiments, the stored relations between one or more transmission factors/quotas K and corresponding GCL values are estimated/calculated using a gas cell construction, as illustrated for example in FIGS. 6A and 6B.

Figure 6A:
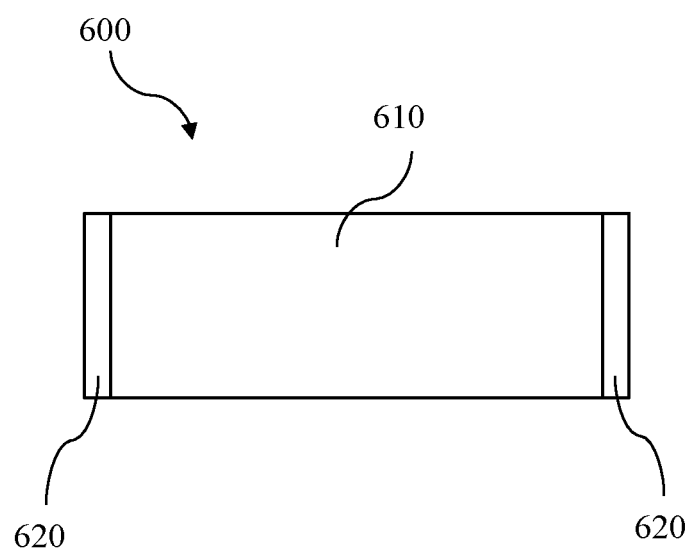
FIG. 6A shows a schematic view of a gas cell, in accordance with one or more embodiments of the disclosure.

In FIG. 6A, a gas cell 600 is shown that comprises a gas container 610 having windows 620 at the respective opposing ends of the container. The container 610 of the gas cell 600 may e.g. be filled with a known concentration of a predetermined gas (known_gas_concentration). A GCL value of the gas comprised in the gas cell 600 ($GCL_{gas\_cell}$) may thereby be calculated by multiplying the known gas concentration with the known length of the gas cell container (length_of_gas_cell_container) according to the following:

$$GCL_{gas\_cell} = (\text{known\_gas\_concentration}) * (\text{length\_of\_gas\_cell\_container}) \quad \text{(Eq. 18)}$$

The method of FIG. 5B may be performed during production or during operation of the thermal imaging device, the method comprising:

At block 530, determining $GCL_{gas\_cell}$. $GCL_{gas\_cell}$ may be determined using equation 18.

At block 540, calculating values for one or more transmission coefficients $\tau(\lambda i)$. In embodiments, the values for one or more transmission coefficients $\tau(\lambda_i)$ for one or more wavelengths $\lambda_i$ are calculated using a gas cell 600 described in connection with FIG. 6A. The values for one or more transmission coefficients $\tau(\lambda_i)$ may be calculated according to equation 19 described below.

Figure 6B:
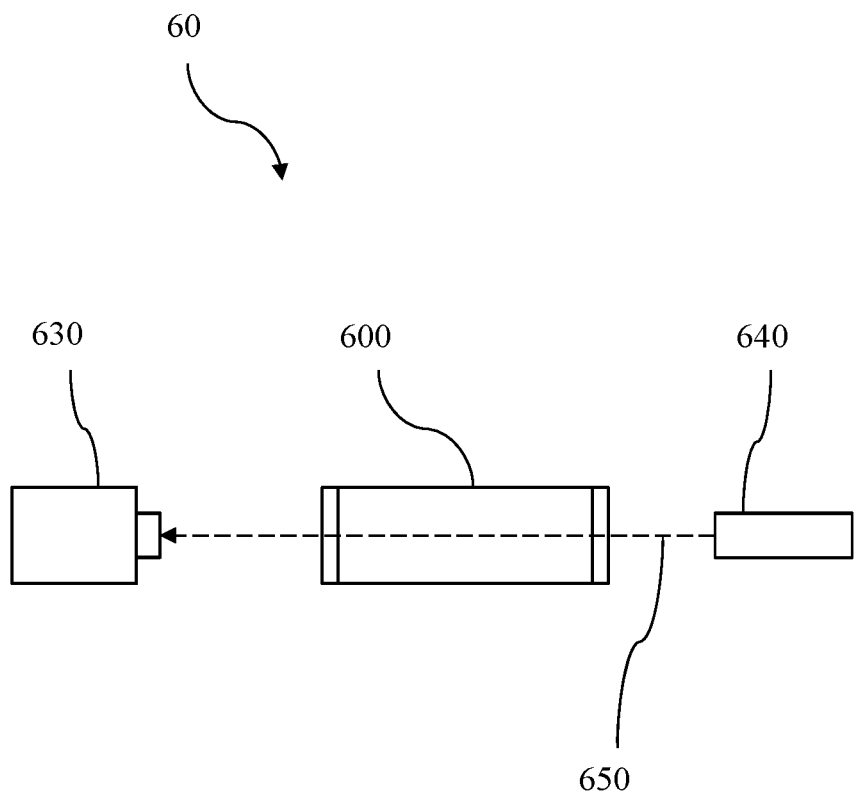
FIG. 6B shows a schematic view of the gas cell of FIG. 6A, a thermal imaging device, and a light source/light emitter emitting one or more light beams through the gas cell onto the detector elements of the thermal imaging device, in accordance with one or more embodiments of the disclosure.

FIG. 6B shows a schematic view of a system 60 for determining a transmission coefficient $\tau(\lambda_i)$ comprising: a gas cell 600, corresponding to the gas cell 600 of FIG. 6A; a light source/light emitter 640, for example corresponding to any of the light emitters described in the disclosure, wherein the light emitter 640 is configured to emit one or more light beams 650; and a thermal imaging device 630, for example corresponding to any of the thermal imaging devices described in the disclosure, wherein the thermal imaging device 630 is configured to receive the one or more light beams 650 emitted from the light emitter 640. The light emitter 640 may be configured to emit one or more light beams 650 through the gas cell 600 onto the detector elements of the thermal imaging device 630, and the windows 620 of the gas cell 600 may be configured to transmit radiation or light of a selected range of wavelengths, corresponding to the wavelengths detectable by the detector elements of the thermal imaging device 630.

Using the system 60, $\tau(\lambda_1)$ and $\tau(\lambda_2)$ can be derived according to the following:

$$\tau(\lambda_1) = \frac{S(\lambda_1, \text{Cell with gas}) - S(\text{light off, Cell with gas})}{S(\lambda_1, \text{Cell without gas}) - S(\text{light off, Cell without gas})} \quad \text{(Eq. 19)}$$

The configuration of the system 60 for determining a transmission $\tau(\lambda_i)$ is a non-limiting example of how such a system may be configured. Other configurations are also possible. For example, the thermal imaging device and the light source may be placed on the same side of the gas cell, whereby a reflecting surface is placed on the opposite side of the gas cell. For different configurations, equation 19 must be adjusted correspondingly.

At block 550, calculating a corresponding value for K based on each of the values for one or more transmission coefficients $\tau(\lambda_i)$. In one or more embodiments, K can be estimated/calculated according to any of the various techniques for determination of K that have been described in connection with block 290 and FIG. 5A for various embodiments, using the gas cell container 610 in the place of an observed gas cloud. In one embodiment, K is calculated according to equation 8.

At block 560, storing a relation between each calculated value for GCL and the corresponding calculated value for K.

The actions at block 530, 540 and 550 may be performed using gas cells 600 of different lengths and gases of different concentration, in any manner, thereby generating in block 560 a lookup table, or other description comprising relations, or mappings, between one or more values for GCL corresponding values for K.

As described above for block 290, the thermal imaging device 110 may, according to one or more embodiments, be configured to quantify gas detected to be present in the observed real world scene based on the first and second IR images. In one or more embodiments, the processor 112 integrated in the thermal imaging device 110, or an external processor connected to, communicatively coupled to, or configured to receive image data from the thermal imaging device 110, is configured to perform quantification of detected gas by performing any or all of the blocks, calculations or functions described in connection with block 290.

Light Emitter Stabilization

The images/signals captured by the thermal imaging device are captured at different time instances, which will give rise to noise in any difference image calculated since the observed real world scene will have changed, however slightly, from one time instance to the next. One way of minimizing the difference, which may be caused by a changing real world scene, between the captured images used for the gas detection and/or quantification is to capture the images in close succession as described above, for example as consecutive images in a series of image frames. The time difference between the captured images may here be dependent on the frame rate of the thermal imaging device. As previously mentioned, the signal may be integrated over a plurality of images at any suitable number of images. In some embodiments, the sequence of images used for generation of a difference image D and/or a quota/transmission factor K, used for detection and/or quantification of gas, may be repeated several times and the signal may thereby be integrated over a larger number of images.

According to one or more embodiments, the light emitter can be controlled to switch on and off and to switch between different wavelengths, e.g. $\lambda_1$ and $\lambda_2$, but any suitable number of different wavelengths may be applied. In some embodiments, the light emitter is controlled to be switched on and off, and/or to switch between different wavelengths, such that the light emission of the light emitter is synchronized with the capturing of images by the thermal imaging device.

Specifically for one or more embodiments, the illuminator system controller may be adapted to: control the light emitter to emit light having the wavelength $\lambda_1$ during a time when the thermal imaging device is adapted to capture an IR image $S_{gas\ 1}$ comprising light having the wavelength $\lambda_1$; control the light emitter to emit light having the wavelength $\lambda_2$ during a time when the thermal imaging device is adapted to capture an IR image $S_{gas\ 2}$ comprising light having the wavelength $\lambda_2$; and/or control the light emitter to switch off and not emit any light during a time when the thermal imaging device is adapted to capture an IR image $S_{gas\ 0}$ representing the background of the real world scene.

In some embodiments, the light emitter is configured to be able to switch between wavelengths, or to be switched on and off, at a rate that is significantly higher than the frame rate of the thermal imaging device. Thus, it is the frame rate, and possibly also the synchronization settings, of the thermal imaging device that sets the limits for how close in succession images used in the gas detection and/or quantification may be captured.

Synchronization of the light emission of the light emitter with capturing of images is advantageous, since it ensures that when an image is captured, the light emitter is correctly turned on or off, and if turned on it is controlled to emit the intended wavelength or wavelength interval of IR light. Thus, reliable measurements are obtained.

In some embodiments, noise in the difference image D or quota/transmission factor K may be reduced by stabilizing the light emitter beam, whereby the light emitter is controlled to illuminate the same or substantially similar, e.g., to the extent allowed by typical fabrication process or light emitter, part of the observed real world scene. In some embodiments, the processor is configured to stabilize the light emitter beam, in any manner known in the art.

Adjustment of Image/Signal Levels

In equations 5 to 8, 11, and 12, an amplification factor/gain has been disclosed for use to adjust the levels of the captured images/signals. Alternatively, or in addition, such adjustments may be obtained by for example adjusting light emitter parameters such as input current and/or temperature, and/or controlling the amount of time that the light emitter illuminates the observed real world scene with light of a certain wavelength during capturing of an image/signal.

In some embodiments, a processor integrated in, connected to, communicatively coupled to or configured to receive data from a thermal imaging device is configured to adjust light emitter parameters such as input current and/or temperature, and/or control the amount of time that the light emitter illuminates the observed real world scene with light of a certain wavelength during capturing of an image or a radiation signal, based on the amplification factor or gain.

Alternative Embodiment for Capturing Images

In embodiments disclosed herein, a plurality of consecutive images/signals are captured. This means that if the observed real world changes or if the thermal imaging device moves between two captured images/signals, noise/disturbance may be introduced in the captured images/signals and consequently in the measurements or calculations based on the captured images/signals. To solve this problem, the thermal imaging device comprises, in some embodiments, two IR detectors comprising IR detector elements and a beam splitter configured to transmit light of a first wavelength, for example $\lambda_1$, and to reflect light of a second wavelength, for example $\lambda_2$, wherein the beam splitter and IR detectors are positioned such that the beam splitter transmits light of the first wavelength onto a first of the two IR detectors and reflects light of the second wavelength onto the second of the two IR detectors. In embodiments, the light emitter is controlled to switch between the first wavelength and the second wavelength at a rate that is significantly faster/higher than the frame rate of the IR imaging system of the thermal imaging device, meaning that the first and second IR detectors can receive light of both wavelengths at the same time, emitted by the single light source. In embodiments, the illuminator controller is configured to control the light emitter to switch between different wavelengths. Thus, the first and second IR detectors will each capture an image, the respective images being captured at the same time instance, but comprising information relating to light or radiation of different wavelengths. This leads to the advantageous effect that two images are obtained that may serve as a basis for a difference image calculated according to any of the embodiments described herein, wherein there is no time delay between the two images, and the captured parts of the observed real world scene that do not comprise gas will be identical, or substantially identical, in the two captured images. Thus, the difference image will comprise no, or a very small amount of, noise that is introduced due to changes in the observed real world scene and that may be wrongfully interpreted/detected as gas. A further advantageous effect is that the difference image may be processed or filtered to a great extent without introduction of artifacts. In embodiments where the thermal imaging device has moved during use, due to it being a non-fixedly mounted thermal imaging device, for example a handheld thermal imaging device, the captured images may be stabilized before gas detection and/or quantification is performed. Alternatively, a fixedly mounted thermal imaging device may be used.

As an alternative to the beam splitter it would also be possible, in manners known in the art, to direct the received radiation from the observed real world scene onto a first and a second IR detector via a respective first and second filter, wherein the first filter is configured to transmit light of a first wavelength, for example $\lambda_1$, to the first IR detector and the second filter is configured to transmit light of a second wavelength, for example $\lambda_2$, to the second IR detector.

In embodiments, the amplification factor $Gain_D$ of equation 11 and 12 is adjusted such that D=0 when there is no gas present in the observed real world scene, during calibration.

In another aspect, various techniques may be implemented according to some embodiments to reduce the effect of the radiation that is reflected from the background of the observed real world scene. As discussed above, $W_{light}$ is the radiation that is reflected from the background of the observed real world scene, which affects the captured images/signals to be used for gas detection. As also discussed above, in various embodiments, the light emitter comprises a lens that is placed in the path of the emitted light beam or light beams. In this regard, the lens in one or more embodiments may be configured to expand and/or reduce the beam size, whereby the inclusion of such a lens increases the sensitivity and flexibility of the gas detection and/or quantification of the thermal imaging device. For example, if there is a great distance between the thermal imaging device and the part of the observed real world scene that is under investigation, the area that is illuminated by the light emitter may be reduced, thereby increasing the sensitivity of the system. In another example, if the background gives a very low reflection, the area that is illuminated by the light emitter may also be reduced to increase the sensitivity of the system.

In some cases, the concentration of gas present in the observed real world scene is very high relative to the effect $W_{light}$ per area unit, whereby the captured image/signal is saturated. If the image/signal is saturated, interpretations, measurements and/or calculations based on the image/signal are likely to be erroneous.

Figure 7A:
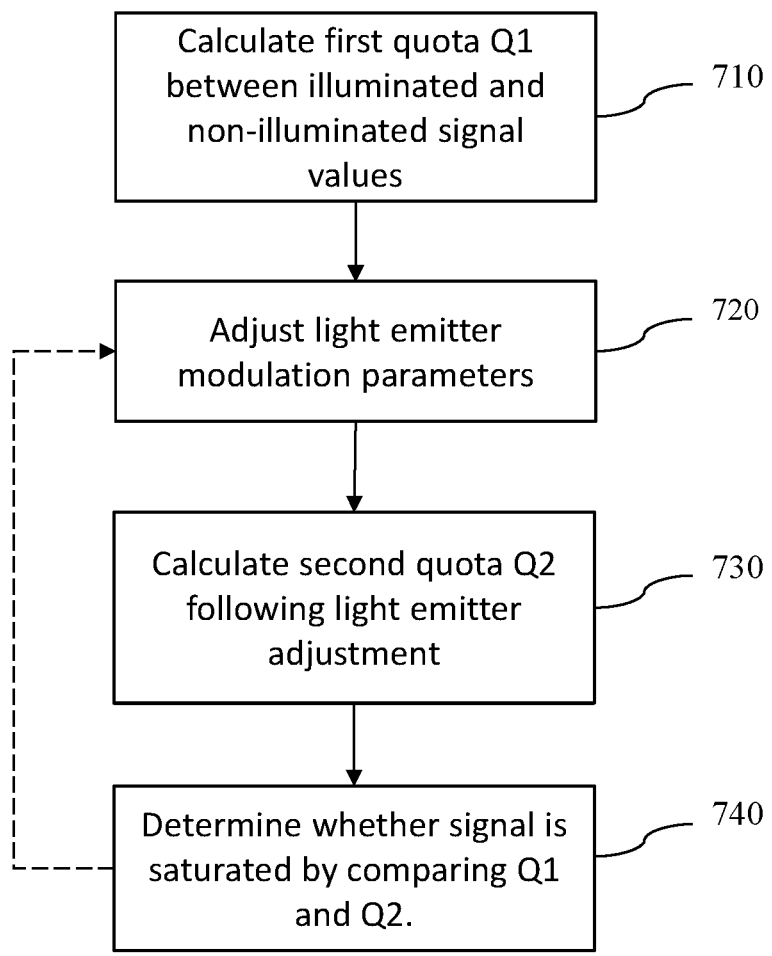
FIG. 7A shows a flow diagram of a method for solving the problem of a saturated image/signal, in accordance with one or more embodiments of the disclosure.

In one or more embodiments, a solution to the problem of a saturated image or radiation signal may be obtained by the method illustrated in FIG. 7A, the method comprising:

At block 710, calculating a first quota Q1 between the values of an image captured when the observed real world scene is illuminated with light of a wavelength within an absorption spectrum of an observed gas, for example $\lambda_1$, and an image captured when the observed real world scene is illuminated with light of a wavelength that is not within an absorption spectrum of the observed gas, for example $\lambda_2$, or alternatively when the observed real world scene is not illuminated.

In some embodiments, the first quota Q1 may be used for approximating the detection possibility of, or alternatively quantify, the gas present in the observed real world scene, according to any of the embodiments presented herein. The result of the calculation may for example be stored as one value for each pixel in a captured image.

At block 720, adjusting light emitter modulation parameters. In embodiments, adjusting light emitter modulation parameters may comprise a selection of: turning the light emitter on or off according to preset rules; or adjusting the output effect (e.g., the output power) of the light emitter by for example adjusting the input current or using one or more dampening filters.

At block 730, calculating a second quota Q2, after the parameter modulation of step 720, between the values of a signal/image captured when the observed real world scene is illuminated with light of a wavelength within an absorption spectrum of an observed gas and a signal/image captured when the observed real world scene is illuminated with light of a wavelength that is not within an absorption spectrum of the observed gas, or alternatively when the observed real world scene is not illuminated.

The result of the calculation may for example be stored as one value for each pixel in a captured image.

At block 740, determining whether the signal/image is saturated by comparing Q1 and Q2. If Q1 #Q2, the signal/image is not saturated and no further action needs to be taken. In this case, this is the last step of the method. If Q1=Q2 (i.e., Q1 and Q2 are same or substantially same), the signal/image is considered to be saturated. In this case, the method is iterated from block 720 to block 740, as illustrated by the dashed arrow in FIG. 7A. Q1 and Q2 may be determined to be substantially same if the difference is within an appropriate threshold such as a margin of error. The iterations continue until Q1≠Q2. In some embodiments, if Q1=Q2, the method further comprises providing feedback to the user of the thermal imaging device indicating that the values of the captured signal/image are unreliable and/or likely to be saturated.

Another problem that may occur is that the signal to noise ratio (SNR) may be too low, resulting in that the light reflected from the background in the observed real world scene is drowned by noise in the image/signal captured by the IR detector or IR detector elements. Thus, any gas present in the scene may be impossible to detect in a visual representation of the captured image/signal, and/or gas detection and/or quantification performed by the thermal imaging device according to any of the embodiments presented herein may be rendered impossible. A sufficiently high SNR and a sufficiently good reflectance of the emitted light from the background of the observed real world scene is crucial for enabling gas detection and/or quantification using the captured image/signal. The reflectance of the background also differs depending on the type of light emitted by the light emitter.

In this regard, the area in the observed real world scene that is illuminated by the light emitter, which may be referred to as the beam size of the light emitter, may be reduced or expanded automatically, semi-automatically, or manually by a user of the system, according to some embodiments. Generally, a smaller beam size provides a higher effect of light emitted per illuminated area unit. A reason for making such adjustments may be to optimize the signal to noise ratio (SNR) such that the light reflected from the background in the observed real world scene is not drowned by noise in the image/signal captured by the IR detector elements, as previously mentioned. Another reason may be that not enough of the emitted light is reflected in the background, due to the background having low reflection for the type of light emitted by the light emitter.

The actual adjustment of the beam size of the beam emitted by the light emitter may be performed using a mechanical or electro mechanical beam expander server motor configured to displace one or more optical elements of the light emitter along one, two or three orthogonal axes.

Figure 7B:
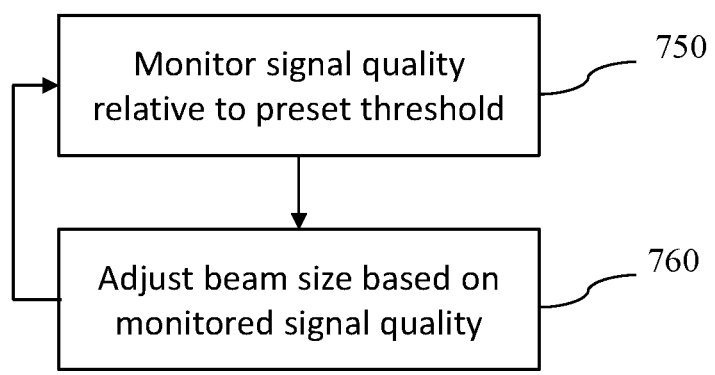
FIG. 7B shows a flow diagram of a method for automatic beam size adjustments, in accordance with one or more embodiments of the disclosure.

Thus, in some embodiments, a method for automatic beam size adjustments may be performed. FIG. 7B shows a flow diagram of such a method in accordance with an embodiment of the disclosure. As shown in FIG. 7B, the method may comprise the following operations according to one or more embodiments.

At block 750, continuously comparing the relationship between the output effect of the light emitter and the reflected light received by the IR detector elements against a preset threshold, wherein the preset threshold is based on the SNR or another signal quality measure; and At block 760, adjusting the beam size of the beam emitted by the light emitter until the measured SNR or other quality parameter exceeds, or in other embodiments is equal to or exceeds, said preset threshold value.

According to some embodiments, the system may be configured to perform automatic beam size adjustments. For example, the illuminator system controller, the processor, and/or other component of the thermal imaging device may be configured to: continuously compare the relationship between the output effect of the light emitter and the reflected light received by the IR detector elements against a preset threshold, wherein the present threshold is based on the SNR of the signal or another signal quality measure; and generate a beam size adjustment control signal if said comparisons shows that the measured SNR or other quality parameter is equal to or below, or in other embodiments if the measured SNR or other quality parameter is above, said preset threshold value.

Further, according to such embodiments, the system may comprise a beam expander server motor configured to: receive a beam size adjustment control signal from the illuminator system controller; and iteratively adjust the beam size of the beam emitted by the light emitter in response to the beam size adjustment control signal, until the measured SNR or other quality measure exceeds, or in other embodiments until the measured SNR or other quality measure is equal to or exceeds, said preset threshold value.

In some embodiments, manual adjustment of the beam size is enabled. Manual beam size adjustment may for example be enabled by a method comprising: generating a control signal in response to input from a user; and communicating the control signal to an illuminator system controller, the illuminator system controller being configured to control a beam expander server motor to adjust the beam size of the beam emitted by the light emitter based on the control signal.

According to some embodiments, the system may be configured to perform beam size adjustments in response to manual input. For example, the thermal imaging device may comprise one or more input device configured to: receive input from a user interacting with the one or more user input device; generate a beam size adjustment control signal in response to said received user input; and communicate the beam size adjustment control signal to an illuminator system controller. In such embodiments, the illuminator system controller may be configured to control a beam expander server motor to adjust the beam size of the beam emitted by the light emitter based on the beam size adjustment control signal, and the beam expander server motor may be configured to receive a beam size adjustment control signal from said illuminator system controller and adjust the beam size of the beam emitted by the light emitter in response to said beam size adjustment control signal.

Sometimes the reflectance from the background in the observed real world scene is low with regard to the light emitted by a light emitter in a thermal imaging device used for gas detection, but the user of the thermal imaging device may not be aware of the low reflectance. The user may interpret resulting signals/images captured by the thermal imaging device as providing evidence that there is no gas present in observed real world scene, when it is in fact the low reflectance of the background that is making the gas hard to distinguish using the thermal imaging device.

Accordingly, in some embodiments, a method for improving the background reflection may be performed. Such a method according to one or more embodiment comprises: continuously comparing the relationship between the output effect of the light emitters and the reflected light received by the IR detector elements against a preset threshold, wherein the present threshold is based on the SNR; and providing feedback to a user of the system. For example, in some embodiments, the system may be configured to provide feedback to a user of the system indicating a selection of the following: that manual adjustment of the beam size is recommended; that the system should be moved in order to obtain a better background reflection of the emitted light in the observed real world scene; and/or more specific suggestions such that a reflector shield should be placed as a background.

The feedback options described above are all made in view of obtaining a signal of good enough quality to detect and/or quantify gas in the observed real world scene.

Advantages

Through the combination of a light emitter and a thermal imaging device, the sensitivity of the system is significantly increased. Thus, the sensitivity of an already sensitive system, such as a cooled system, is further increased and for example enables more precise detection and quantification of gas, and further detection and quantification of very small amounts/traces of gas.

An advantage of embodiments of the present invention is therefore that gas detection with high sensitivity is enabled using both cooled and uncooled thermal imaging devices or systems.

In another aspect, gas detection and quantification is enabled for less sensitive systems, for example un-cooled systems, that were not previously sensitive enough to detect and/or quantify gas at all. A further advantage of embodiments of the present invention is therefore that gas quantification is enabled using both cooled and uncooled thermal imaging devices.

User Feedback

One or more embodiments, may comprise providing feedback to the user by communicating information regarding, for example, one or more of the following:

the presence of gas detected, or the probability of the presence of gas, in the observed real world scene.
the location of gas in the observed real world scene.
the quantified amount of gas present in the observed real world scene.
low reflectance that needs to be addressed.
that the intensity of the capture image/signal is not at a recommended level and/or needs to be adjusted.
other quality measures related to the captured image/signal.

- the need to adjust the beam size of the emitted light of the light emitter, due to for example low SNR, and/or selectable options for adjustment of the beam size.
- the need to adjust other settings of one or more of the devices comprised in the thermal imaging device, and/or recommendations for how to adjust settings of one or more of the devices comprised in the thermal imaging device, and/or selectable options for adjustment of settings of one or more of the devices comprised in the thermal imaging device.
- adjustment options for devices coupled to the thermal imaging device.
- measured temperatures, hot spots, cold spots, temperature span and/or level, dew point information, temperature related alarms etc. as is well known in the art of thermal imaging.
- post-processing possibilities for captured images.
- annotation possibilities.
- possibilities to store captured images/signals and/or settings of the thermal imaging device.
- any general information relating to the observed real world scene.
- communication of captured images/signals and/or related data to an external unit.

In various embodiments, feedback according to any or all of the examples above, or relating to other relevant information, may be provided to a user of the system for example as on or more of:
- visual or graphical information presented on a display integrated in or communicatively coupled to the thermal imaging device.
- numeric information presented on a display integrated in or communicatively coupled to the thermal imaging device.
- sound communicated using speakers integrated in or communicatively coupled to the thermal imaging device.
- haptic or tactile information.

Compensating Drift or Offset of Emitted Light Wavelength

During operation of the illuminator system, the operating conditions such as ambient temperature and internal heat generation in the equipment may change and thereby cause a drift or offset of the emitted laser wavelength. In one or more embodiments this problem is solved by including a feedback system as described herein. FIG. 8A-8C illustrate how a drift or offset of the emitted light wavelength is detected and compensated before capturing a first or a second IR image used to generate a gas representing image.

As previously described, the illuminator system comprises a laser light emitter 193 configured with a primary output 191 comprising a primary optical system and a secondary output 197 comprising a secondary optical system, a beam bender 194 for example in the form of a refractor such as a diffraction grating, an IR imaging system comprising an IR detector 192 and an illuminator system control unit 195.

The laser emitter 193 is configured to emit laser light at a secondary output 197 onto the IR detector 192 via the refractor 194. The refractor 194 is configured to split and/or diffract laser light into multiple beams 830, 840, wherein the IR imaging system 192 is configured or placed in the path of at least one of the diffracted beams 830, 840 and configured to capture an IR image of at least one of the diffracted beams.

The control unit is configured to retrieve or receive the third image and determine a spatial position of at least one of the diffracted beams, e.g. by comparing pixel intensity values of the IR image to a predetermined threshold or determining a local pixel intensity value maxima 8301, 8302. The controller further configured to compare the determined spatial position of at least one of the diffracted beams to a predetermined position, e.g. stored in memory 115 and/or 180, to obtain a spatial pixel displacement value 8303 indicative of a drift from a desired wavelength, such as the first or second wavelength. The control unit can then compensate the light emitter control current and/or a cooling unit control current, generated based on a wavelength data value and the predetermined relation, for a drift from a desired wavelength based on the spatial pixel displacement. In one example, this is achieved by a predetermined relation linking wavelength data value and spatial pixel displacement value 8303 to amplitude and pulse width of the light emitter control current and/or a cooling unit control current, thus correcting the light wavelength drift of the light emitter 193 when the light emitter control current and/or a cooling unit control current is sent to the light emitter and/or cooling unit.

For example, the second predetermined relation may be represented in the form of a look-up table (LUT), indicative of triplets/quadruplets of wavelength data value, spatial pixel displacement value 8303 and control current or laser control current amplitude and/or pulse width values. A processor performing a lookup in the LUT, as would be understood by a skilled person, may use a wavelength data value and spatial pixel displacement value 8303 to look up a corresponding control current amplitude value and/or control current pulse width value, e.g. $I_1$ for $\lambda_1$ and $I_2$ for $\lambda_2$.

FIG. 8B illustrates how a drift or offset of the emitted light wavelength is detected during calibration of the illuminator system, e.g. at the time of production/manufacturing of the illuminator system, to obtain a current beam position 8301, e.g. of a first mode refraction, as a predetermined position or normal position for a control current generated based on a wavelength data value and the (second) predetermined relation.

FIG. 8C illustrates how a drift or offset of the emitted light wavelength is detected during operation of the illuminator system, e.g. when generating a gas representing image, to obtain a current beam position 8302, The current beam position 8302 can then be compared to the predetermined position, in a manner similar to the current beam position 8301 determined in FIG. 8B, to obtain or generate a spatial pixel displacement value 8303, e.g. by calculating an Euclidean distance as would be understood by a person skilled in the art.

As the number of pixels and the physical size of the IR detector, of the second IR imaging system 192, is known then each pixel implicitly have a position that can be used to determine the current position. In one example, an IR detector in the second IR imaging system have 10 by 10 pixels and a physical size of 10 by 10 mm. It is determined that $pixel_{3,3}$ of the detector has the highest pixel intensity value, thus the current position can be determined as (3,3). For example, assuming that a predetermined position have been determined as (3,1) during calibration of the illuminator system, then an Euclidean distance in the form of the spatial pixel displacement value (PDV) can be determined as:

$$PDV = \sqrt{(3-3)^2 + (1-3)^2} = 2 \text{ pixels.}$$

Figure 9A:
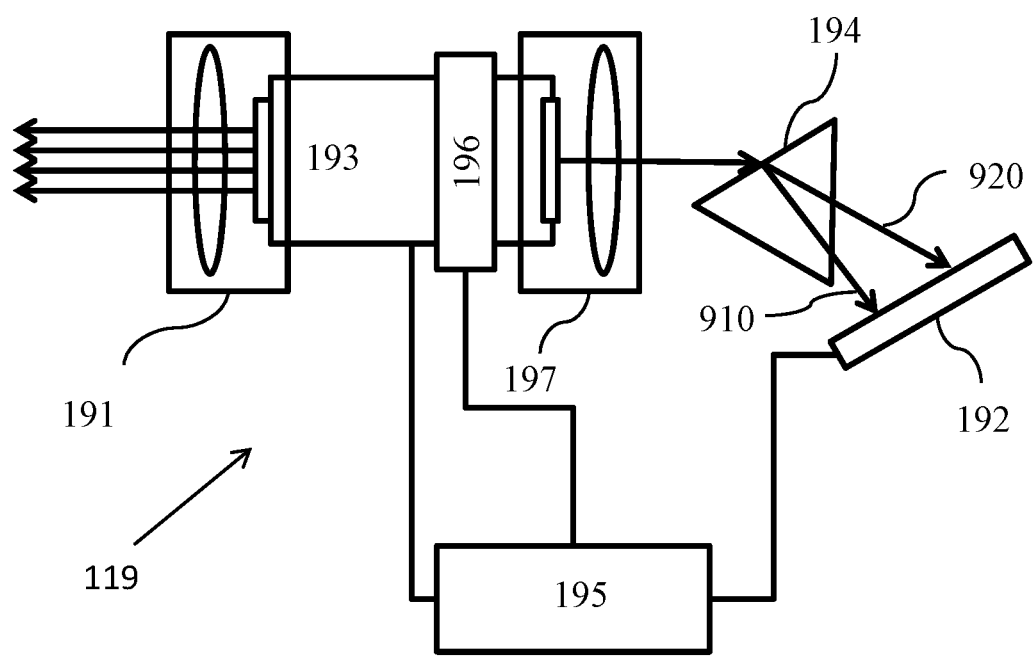
FIG. 9A shows a schematic view of an illuminator system that illustrates an example of how a drift or offset of the emitted light wavelength is detected and compensated by an illuminator system having a beam bender in the form of a prism, in accordance with one or more embodiments of the disclosure.

FIG. 9A illustrates how a drift or offset of the emitted light wavelength is detected and compensated before capturing a first or second IR image used to generate a gas representing image. In one example, the illuminator system comprises a laser light emitter 193 configured with a primary output 191 comprising a primary optical system and a secondary output 197 comprising a secondary optical system, a light emitter cooling unit 196, a refractor 194 in the form of a prism, an IR imaging system 192 and an illuminator system control unit also referred to as control unit 195, wherein said refractor is configured to split and diffracts laser light into multiple beams 910, 920, e.g. into different modes 0, 1, 2 etc.

Figure 9B:
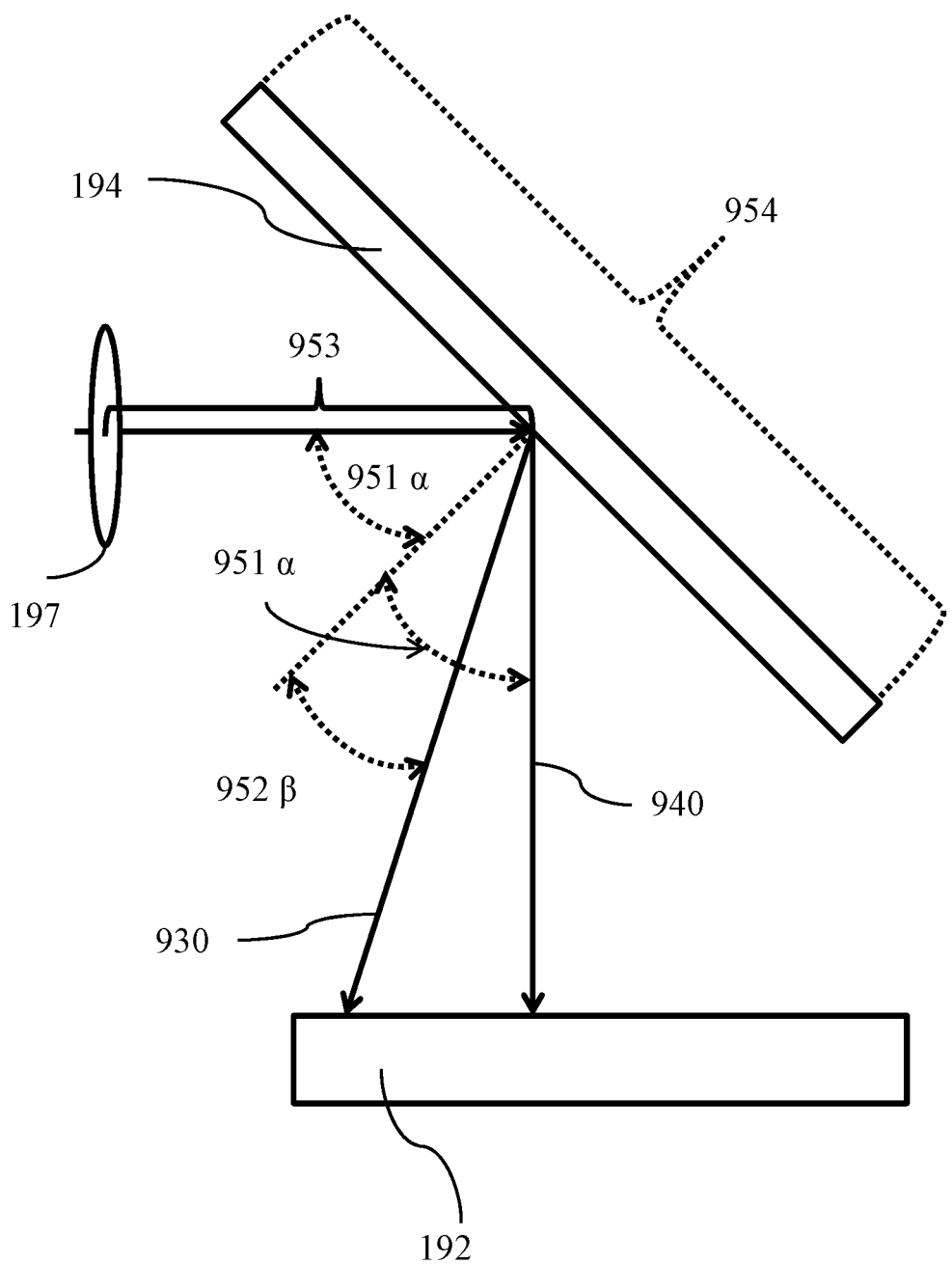
FIG. 9B shows a sketch that illustrates an example of how a drift or offset of the emitted light wavelength is detected by using Huygens-Fresnel principle or the grating equation, in accordance with one or more embodiments of the disclosure.

FIG. 9B illustrates yet an example on how a drift or offset of the emitted light wavelength is detected by using Huygens-Fresnel principle. When a parallel bundle of rays falls on a refractor, such as a grating, rays and wave fronts form an orthogonal set so the wave fronts are perpendicular to the rays and parallel to the grating. The Huygens-Fresnel principle can be used, which means that every point on a wave front acts like a new source, each transparent slit in the grating becomes a new source so cylindrical wave fronts spread out from each. These wave fronts interfere either constructively or destructively depending on how the peaks and valleys of the waves are related. If a peak falls on a valley consistently (called destructive interference), then the waves cancel and no light exists at that point. On the other hand, if peaks fall on peaks and valleys fall on valleys consistently (called constructive interference), then the light is made brighter at that point. When the path difference between the light from adjacent slits is equal to half the wavelength $\lambda/2$ the waves will all be out of phase, and thus will cancel each other to create points of minimum intensity. Similarly, when the path difference is $\lambda$, the phases will add together and maxima will occur. The maxima occur at angles $\theta m$, which satisfy the grating equation relationship:

$$d*\sin(\theta_m) = \lambda*|m|$$

If a plane wave is incident at any arbitrary angle $\theta_i$, the grating equation becomes:

$$d*((\sin(\theta_i) + \sin(\theta_m)) = \lambda*|m| \Rightarrow (\sin(\theta_i) + \sin(\theta_m) = \frac{\lambda*|m|}{d}$$

where $\theta_m$ is the angle between the diffracted ray and the grating's normal vector, and d is the distance from the center of one slit to the center of the adjacent slit, and m is an integer representing the propagation-mode of interest. A grating has a 'zero-order mode' (where m=0), in which there is no diffraction and a ray of light behaves according to the laws of reflection and refraction the same as with a mirror or lens respectively, illustrated by beam 940 and angle 951 α. A grating has also a 'first-order mode' (where m=1), in which there is diffraction and refraction, illustrated by beam 930 and angle 952 β.

Resolvance or "chromatic resolving power" for a grate used to separate the wavelengths of light is defined as:

$$R = \frac{\lambda}{\Delta\lambda} = m*N$$

Where N is the total number of slits illuminated and m is the order of the diffraction. The limit of resolution is determined by the Rayleigh criterion as applied to the diffraction maxima, i.e., two wavelengths are just resolved when the maximum of one lies at the first minimum of the other. Since the space between maxima for N slits is broken up into N−2 subsidiary maxima, the distance to the first minimum is essentially 1/N times the separation of the main maxima.

The grating size L, illustrated by 954 in FIG. 9B, can be calculated as:

$$L = N*d$$

Where L is grating size, N is the total number of grooves and d is the distance from the center of one slit to the center of the adjacent slit.

F-number is the ratio of the grating focal length divided by the grating diameter (clear aperture) and can be determined as:

$$F = \frac{f}{L}$$

Where f is the focal length 953.

By selecting the mode m, a suitable diffracted beam 930, 940 can be used to detect drift or offset of the emitted light wavelength. For example, a preferred mode may be such that the diffracted beam hits the second IR imaging system sensor closest to the center.

FURTHER EMBODIMENTS

Calibration

Certain characteristics of IR radiation sensors cause measurement errors. Individual detector elements have unique response characteristics. These response characteristics are found to produce non-uniformities, which result in noise. Additionally, heat generated internally by the thermal imaging device and the environment surrounding the thermal imaging device causes temperature drifts which cause offsets and gain in the captured infrared data compared with infrared data emitted from the observed real world scene. Many infrared cameras have functionality to correct for such non-uniformities and temperature drifts. Such functionality may be referred to herein as IR temperature calibration. For example, some infrared cameras can, either automatically or manually, perform offset compensation/IR temperature calibration, which corrects for such non-uniformities and temperature drifts by observing a uniform IR or thermal scene. More specifically for one example, performing non-uniformity and/or temperature drift correction may include placing a shutter between the optics and the detector elements, measuring offset correction data for each detector element which provides the desired uniform output response, and obtaining a reading of the surrounding environment (e.g., measuring the ambient temperature). These measured non-uniformities offset corrections values and temperature drift offset correction values, herein referred to as IR temperature calibration data parameters, may be stored and later applied in subsequent infrared measurements, when analyzing or interpreting the IR image data values, also referred to as IR image values, to correct for the measurement errors described above.

Aligning

Since a first and a second IR image may be captured at different instances in time, the thermal imaging device might be moved in a way so that the offset, direction and rotation around the optical axis differ between a first and a second image. The optical axis when capturing a first IR image at a first instance and the optical axis when capturing a second IR image a second time instance may be at a distance from each other, and an optical phenomenon known as parallax distance error will arise. The optical axes may be oriented at an angle in relation to each other, and an optical phenomenon known as parallax pointing error will arise. The rotation of the imaging system around the optical axes, and an optical phenomenon known as parallax rotation error will arise. Due to these parallax errors, the captured view of the real world scene might differ between the first image and the second image. In order to combine the first image and the second image, the images must be adapted so that an adapted first image and an adapted second image representing the same part of the observed real world scene is obtained, in other words compensating for the different parallax errors and field of view FOV size. This processing step is referred to as image registration or alignment of the first image and the second image, i.e. the process of transforming different sets of data into one coordinate system. Yet another example of a combined image mode is fusion, wherein gas representing image data values and additional information from a visible light (VL) image is aligned, superimposed and/or combined as a combined image by fusing or blending, e.g. by alpha blending or other fusion techniques, as would be understood by a person skilled in the art. Yet another example of an image mode is contrast enhancing fusion, wherein gas representing image data values and additional information from a VL image is aligned, VL image data values are high pass filtered to extract pixel data representing contours and/or edges in the visible light image, combining luminance information of the extracted pixel data with luminance information of corresponding pixels in the IR image to augment the IR image with the contours and/or edges from the visible light image, as would be understood by a person skilled in the art. Registration or alignment can be performed according to any method known to a skilled person in the art, e.g. intensity-based, feature-based registration using linear or elastic transformations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

Software in accordance with the present disclosure, such as program code and/or data, can be stored in non-transitory form on one or more machine-readable mediums. It is also contemplated that software identified herein can be implemented using one or more general purpose or specific purpose computers and/or computer systems, networked and/or otherwise.

In embodiments, there is provided a computer program product comprising computer readable code configured to, when executed in a processor, perform any or all of the method steps described herein. In embodiments, there are provided a non-transitory computer readable memory on which is stored computer readable and computer executable code configured to, when executed in a processor, perform any or all of the method steps described herein.

Embodiments described above illustrate but do not limit the invention. It should also be understood that numerous modifications and variations are possible in accordance with the principles of the invention. Accordingly, the scope of the invention is defined only by the following claims.

The invention claimed is:

1. A method of detecting gas, the method comprising:
    illuminating, with a controllable illuminator system, a scene with light including radiation within an infrared (IR) wavelength range;
    controlling the illuminator system to emit the light at a first wavelength $\lambda_1$ corresponding to a first absorption level of a gas and at a second wavelength $\lambda_2$ different from the first wavelength $\lambda_1$ and corresponding to a second absorption level of the gas, such that a substantially equal first amount of radiant energy over a time period 'r is emitted onto the scene for each of the first and second wavelengths;
    capturing, with an IR detector array of a thermal imaging device, a first IR image of the scene being illuminated with the light at the first wavelength $\lambda_1$ and a second IR image of the scene illuminated with the light at the second wavelength $\lambda_2$;
    comparing the first and second IR images to determine a first transmission factor for at least one specific gas;
    repeating the illuminating, the controlling, the capturing, and the comparing using a second different amount of radiant energy to determine a second transmission factor; and
    comparing the first and the second transmission factors to determine whether the first and second IR images are saturated.

2. The method of claim 1, wherein the IR detector, for detected radiation within the first and second wavelength reflected from a background in the scene, is adapted to generate:
    a high output signal level in the absence of gas in the scene; and
    a low output signal level in the presence of gas in the scene, due to absorption of radiation within the first and/or second wavelength.

3. The method of claim 1, wherein:
    the first wavelength $\lambda_1$ is absorbable by a first gas;
    the second wavelength $\lambda_2$ is absorbable by a second gas;
    the first wavelength $\lambda_1$ has a low absorption value for the first gas or the second gas; and
    the second wavelength $\lambda_2$ has a high absorption value for the first gas or the second gas.

4. The method of claim 1, further comprising:
    controlling the illuminator system to turn off illumination of the scene;
    capturing a third IR image of the non-illuminated scene; and
    comparing the first, second and third IR images to determine whether a characteristic for a specific gas is represented in the first and/or second IR images.

5. The method of claim 1, wherein the illuminator system is controlled with pulse width modulation such that the substantially equal amount of radiant energy is emitted during the time period $\tau$ for each of the first and second wavelengths, and wherein the time period $\tau$ is selected to correspond to the time constant of the IR detector of the thermal imaging device.

6. The method of claim 1, further comprising quantifying gas present in the scene based on the first and the second IR images and/or as indicated by an output signal of the IR detector, and wherein the comparing comprises generating a difference image based on the first IR image, the second IR image, and a third IR image.

7. The method of claim 1, further comprising quantifying gas present in the scene by:
   determining a gas concentration length (GCL) for the gas present in the scene;
   determining a length associated with the gas present in the scene; and
   calculating a concentration of the gas using the GCL and the length associated with the gas.

8. The method of claim 1, wherein the IR detector is a first IR detector, the method further comprising:
   receiving the light by a feedback system comprising a grating and a second IR detector;
   diffracting and/or refracting the light by the grating to the second IR detector; and
   wherein the controlling comprises adjusting the first wavelength $\lambda_1$ or the second wavelength $\lambda_2$ to correct for wavelength drift in response to spatial positions of peaks and valleys of the light on the second IR detector in accordance with a Huygens-Fresnel principle.

9. The method of claim 1, wherein the method further comprises:
   providing feedback to a user if the first and second IR images are saturated; and
   quantifying the gas present in the scene using at least one of the transmission factors if the first and second IR images are not saturated.

10. The method of claim 1, further comprising:
    determining a signal quality measurement from the first or second image;
    comparing the signal quality measurement with a threshold;
    adjusting a beam size of the light emitted at the first wavelength $\lambda_1$ or the second wavelength $\lambda_2$; and
    repeating the capturing, the determining, the comparing the signal quality measurement, and the adjusting to update the signal quality measurement in relation to the threshold.

11. A system for detecting gas, the system comprising:
    a controllable illuminator system configured to illuminate a scene with light including radiation within the infrared (IR) wavelength range;
    a control unit configured to control the illuminator system to emit light at a first wavelength $\lambda_1$ corresponding to a first absorption level of a gas and at a second wavelength $\lambda_2$ different from the first wavelength 2 and corresponding to a second absorption level of a gas, such that a substantially equal first amount of radiant energy over a time period 'r is emitted onto the scene for each of the first and second wavelengths; and
    a thermal imaging device configured to capture a first IR image of the scene being illuminated with light at the first wavelength $\lambda_1$ and a second IR image of the scene illuminated with light at the second wavelength $\lambda_2$ by an IR detector array; and
    wherein the system is configured to:
       compare the first and second IR images to determine a first transmission factor for at least one specific gas,
       repeat the illuminate, the control, the capture, and the compare operations using a second different amount of radiant energy to determine a second transmission factor, and
       compare the first and the second transmission factors to determine whether the first and second IR images are saturated.

12. The system of claim 11, wherein an IR detector of the thermal imaging device, for detected radiation within the first and second wavelength reflected from a background in the scene, is configured to generate:
    a high output signal level in the absence of gas in the scene; and
    a low output signal level in the presence of gas in the scene, due to absorption of radiation within the first and/or second wavelength.

13. The system of claim 11, wherein:
    the first wavelength $\lambda_1$ is absorbable by a first gas; and
    the second wavelength $\lambda_2$ is absorbable by a second gas;
    the first wavelength $\lambda_1$ has a low absorption value for the first gas or the second gas; and
    the second wavelength $\lambda_2$ has a high absorption value for the first gas or the second gas.

14. The system of claim 11, wherein:
    the control unit is configured to control the illuminator system to turn off illumination of the scene;
    the thermal imaging device is configured to capture a third IR image of the non-illuminated scene; and
    the system of configured to compare the first, second and third IR images to determine whether a characteristic for a specific gas is represented in the first and/or second IR images.

15. The system of claim 14, wherein the system is configured to compare the first and second IR images at least by generating a difference image based on the first, the second and the third IR images.

16. The system of claim 11, wherein the illuminator system is controlled with pulse width modulation such that the substantially equal amount of radiant energy is emitted during the time period $\tau$ for each of the first and second wavelengths, and wherein the time period $\tau$ is selected to correspond to the time constant of an IR detector of the thermal imaging device.

17. The system of claim 11, the system further being configured to quantify gas present in the scene:
    as indicated by an output signal of an IR detector of the thermal imaging device;
    based on the first and the second IR images; and/or
    by determining a gas concentration length (GCL) for the gas present in the scene, determining a length associated with the gas present in the scene, and calculating a concentration of the gas using the GCL and the length associated with the gas.

18. The system of claim 11, wherein the IR detector is a first IR detector, the system further comprising:
    a feedback system comprising a grating and a second IR detector, wherein the grating is configured to diffract and/or refract the light to the second IR detector; and
    wherein the control unit is configured to adjust the first wavelength $\lambda_1$ or the second wavelength $\lambda_2$ to correct for wavelength drift in response to spatial positions of peaks and valleys of the light on the second IR detector in accordance with a Huygens-Fresnel principle.

19. The system of claim 11, wherein the system is configured to:
    provide feedback to a user if the first and second IR images are saturated; and
    quantify the gas present in the scene using at least one of the transmission factors if the first and second IR images are not saturated.

20. The system of claim 11, wherein the system is configured to:
    determine a signal quality measurement from the first or second image;
    compare the signal quality measurement with a threshold;

adjust a beam size of the light emitted at the first wavelength $\lambda_1$ or the second wavelength $\lambda_2$; and repeating the capture, the determine, the compare the signal quality measurement, and the adjust operations to update the signal quality measurement in relation to the threshold.

\* \* \* \* \*

UNITED STATES PATENT AND TRADEMARK OFFICE
CERTIFICATE OF CORRECTION

| | |
|---|---|
| PATENT NO. | : 11,573,172 B2 |
| APPLICATION NO. | : 16/352351 |
| DATED | : February 7, 2023 |
| INVENTOR(S) | : Lannestedt et al. |

It is certified that error appears in the above-identified patent and that said Letters Patent is hereby corrected as shown below:

In the Specification

Column 9, Line 14, change "193 4-96" to --193--

Signed and Sealed this
Second Day of May, 2023

Katherine Kelly Vidal
*Director of the United States Patent and Trademark Office*